(12) United States Patent
Graham

(10) Patent No.: US 11,312,046 B2
(45) Date of Patent: Apr. 26, 2022

(54) COMPRESSION APPARATUS

(71) Applicant: Long Pipes USA, Inc., Yangebup (AU)

(72) Inventor: Neil Deryck Bray Graham, Coogee (AU)

(73) Assignee: Long Pipes USA, Inc., Yangebup (AU)

( * ) Notice: Subject to any disclaimer, the term of this patent is extended or adjusted under 35 U.S.C. 154(b) by 598 days.

(21) Appl. No.: 15/368,154

(22) Filed: Dec. 2, 2016

(65) Prior Publication Data

US 2017/0080612 A1 Mar. 23, 2017

Related U.S. Application Data

(63) Continuation of application No. PCT/AU2015/000332, filed on Jun. 3, 2015.

(30) Foreign Application Priority Data

| Jun. 3, 2014 | (AU) | ................................ | 2014902123 |
| Sep. 26, 2014 | (AU) | ................................ | 2014903846 |

(51) Int. Cl.

| B29C 43/48 | (2006.01) |
| B29C 63/28 | (2006.01) |
| B29C 63/34 | (2006.01) |
| B29C 43/22 | (2006.01) |
| B29C 49/00 | (2006.01) |
| F16L 55/165 | (2006.01) |
| B29L 23/00 | (2006.01) |

(52) U.S. Cl.
CPC ............ *B29C 43/48* (2013.01); *B29C 43/224* (2013.01); *B29C 43/228* (2013.01); *B29C 49/0042* (2013.01); *B29C 63/28* (2013.01); *B29C 63/343* (2013.01); *B29C 63/341* (2013.01); *B29C 2043/483* (2013.01); *B29L 2023/22* (2013.01); *F16L 55/1654* (2013.01)

(58) Field of Classification Search
None
See application file for complete search history.

(56) References Cited

U.S. PATENT DOCUMENTS

| 4,319,872 A | 3/1982 | Lupke et al. |
| 4,426,580 A | 1/1984 | Smith |

FOREIGN PATENT DOCUMENTS

| GB | 794556 A | 5/1958 |
| GB | 819416 A | 9/1959 |
| WO | 2012054992 A1 | 5/2012 |

OTHER PUBLICATIONS

EPO Search Report, dated Oct. 17, 2017.
Notification of Transmittal of International Preliminary Report on Patentability, dated Oct. 17, 2016.

*Primary Examiner* — Monica A Huson
(74) *Attorney, Agent, or Firm* — Merchant & Gould P.C.

(57) ABSTRACT

A compression apparatus (10) for compressing a tubular structure (12) to be formed into a hollow structure (20) such as a pipe comprises contact elements (60) arranged in two sets, (61, 62). The contact elements (60) are adapted to move along a compression section (41) in a coordinated sequence, whereby a portion (12*a*) of the tubular structure (12) within the compression section (41) is compressed between pairs (63) of opposed contact elements. The apparatus (10) includes registration means (110) for causing respective pairs (63) of opposed contact elements (60) to be maintained in registration with each other while moving along the compression section (41).

23 Claims, 9 Drawing Sheets

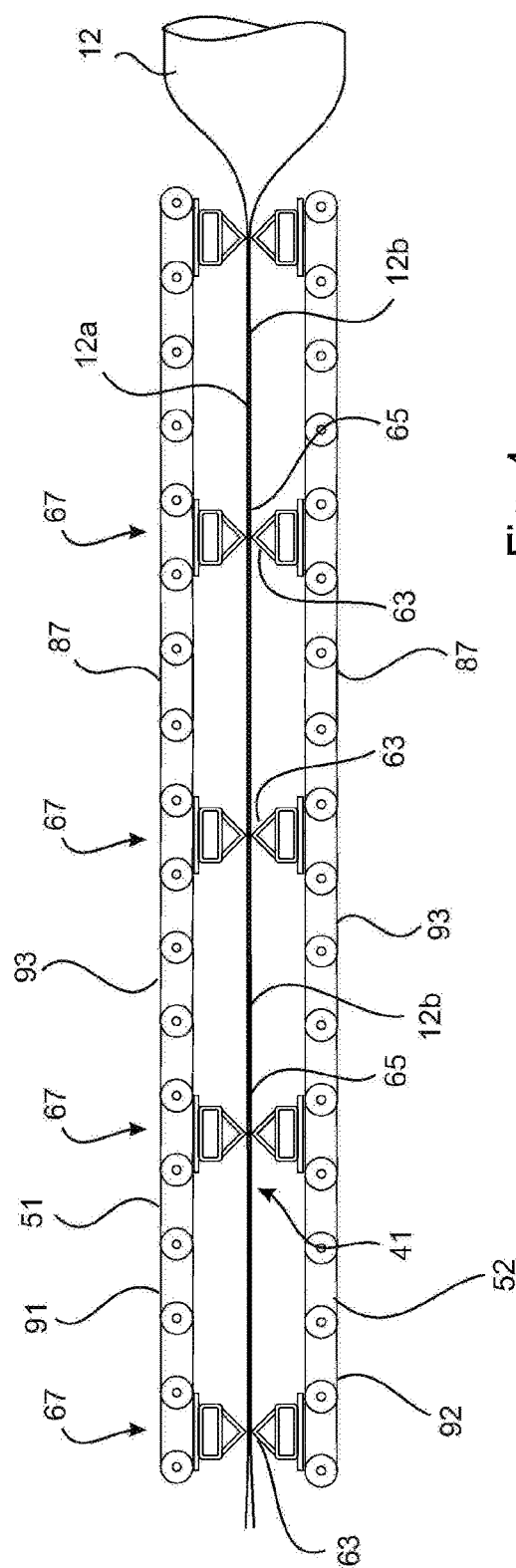
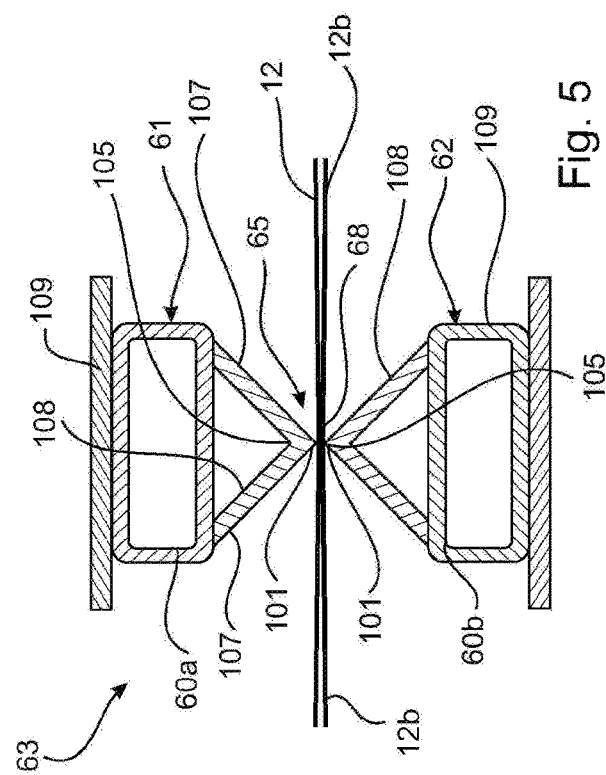
Fig. 4
Fig. 5

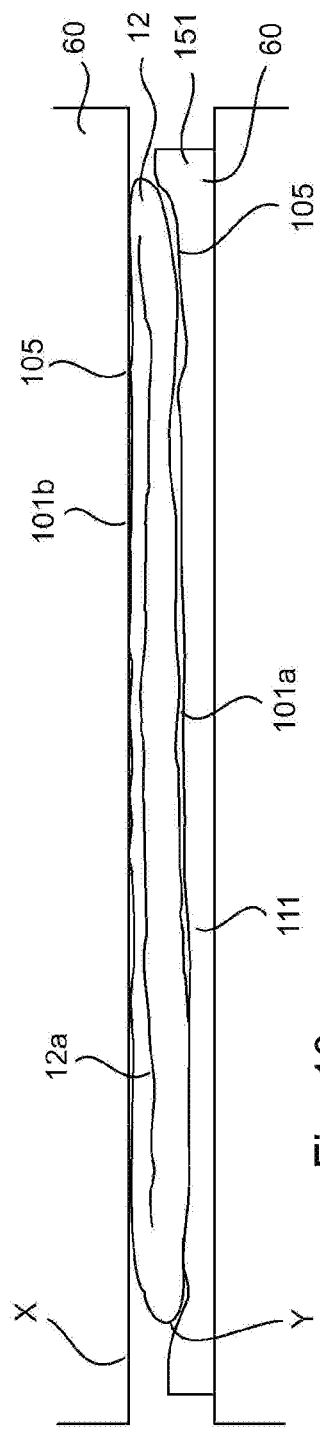
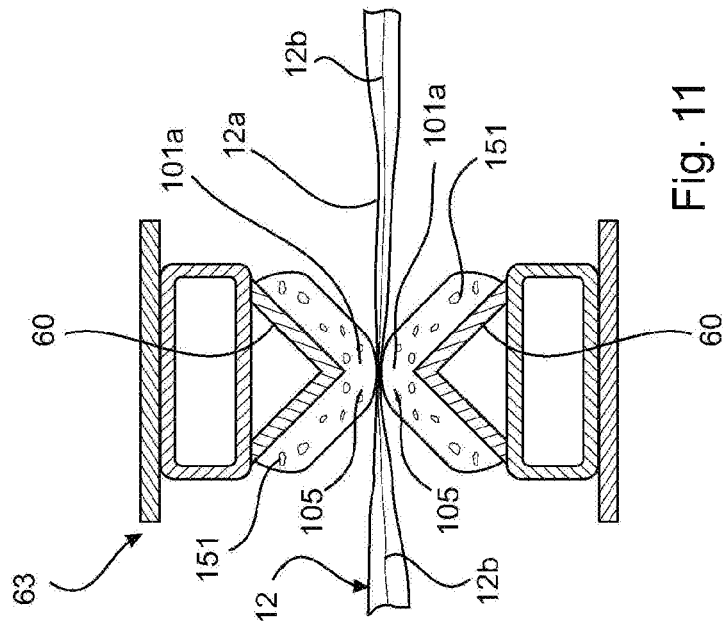
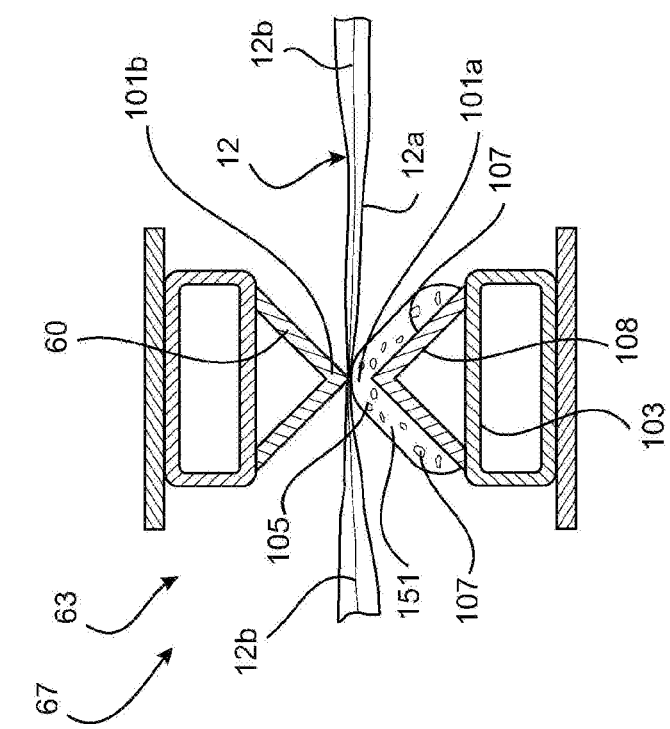

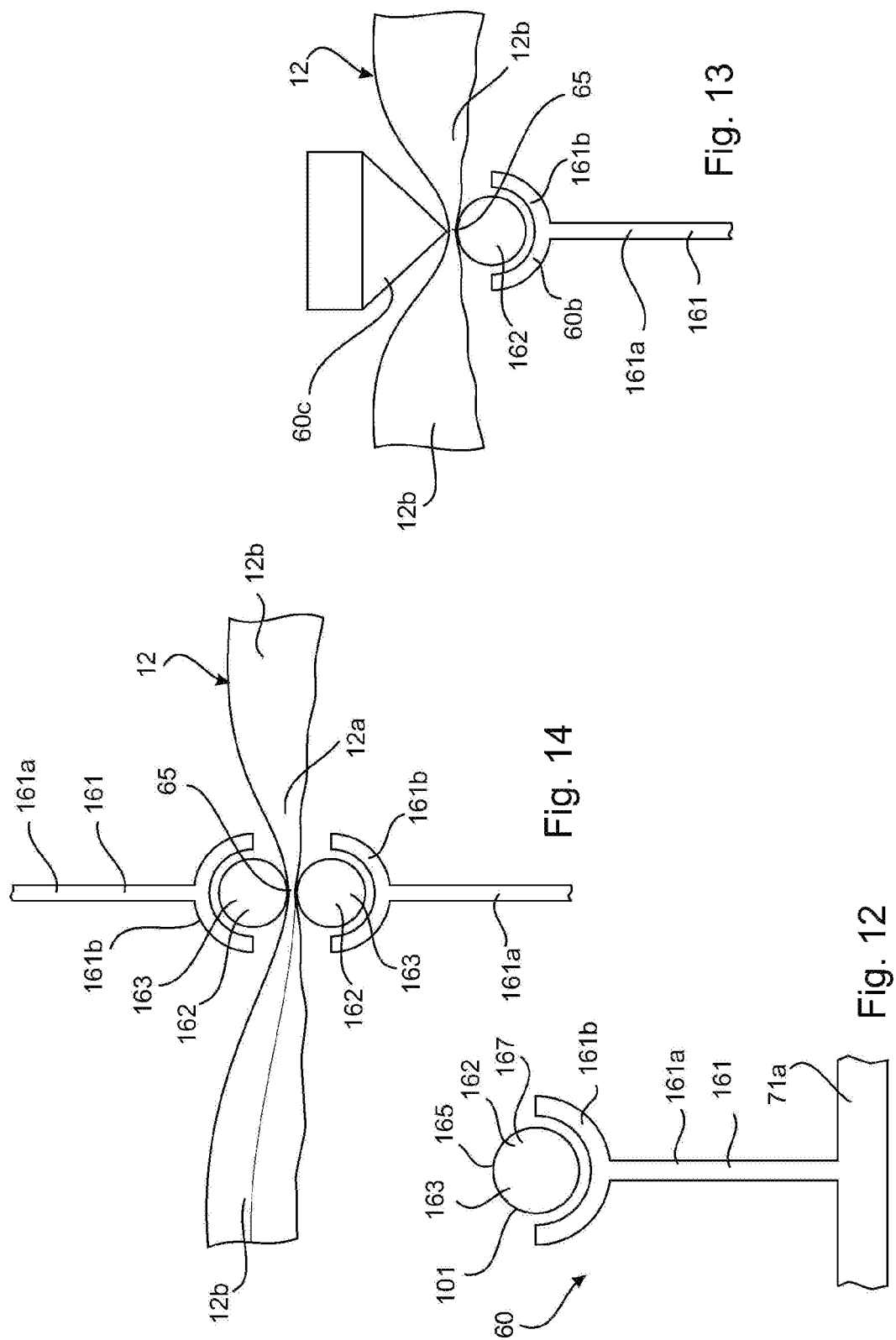

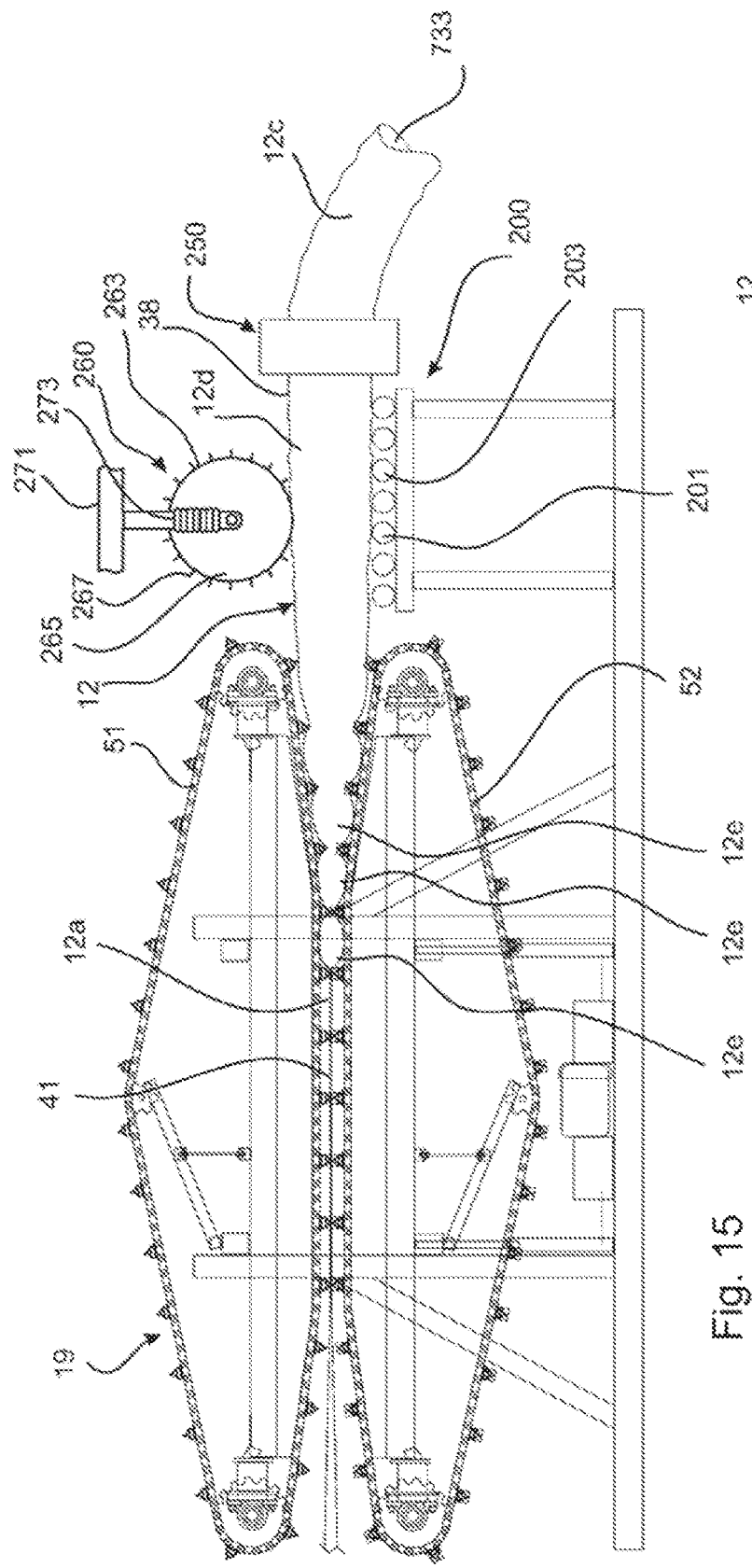
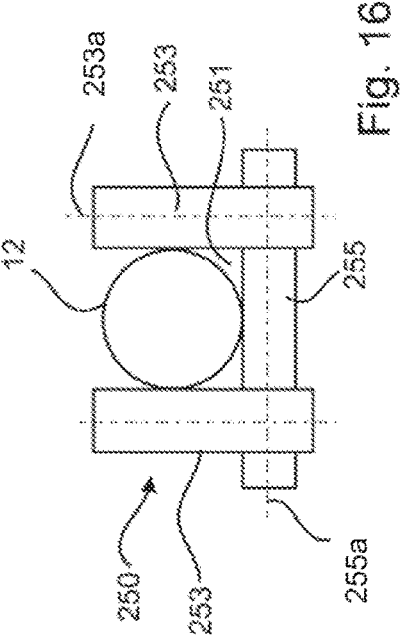

COMPRESSION APPARATUS

CROSS-REFERENCE TO RELATED APPLICATIONS

The present application claims the benefit under 35 U.S.C. § 363, § 365(c) and § 120 of PCT International Application Serial No. PCT/AU2015/000332 to applicant Long Pipes Pty. Ltd., filed Jun. 3, 2015, pending, which in turn claims priority to pending Australia Pat. Appl. Ser. No. 2014903846 to applicant, filed Sep. 26, 2014, and to pending Australia Pat. Appl. Ser. No. 2014902123 to applicant, filed Jun. 3, 2014. The entire contents of each application is hereby incorporated by reference herein.

BACKGROUND

Field

The example embodiments in general are directed to a compression apparatus for progressively compressing an elongate structure at intervals along a portion of the length thereof. The example embodiments have been devised particularly, although not necessarily solely, for compressing a flexible tubular structure.

Related Art

The following discussion of the background art is intended to facilitate an understanding of the example embodiments of the present invention only. The discussion is not an acknowledgement or admission that any of the material referred to is or was part of the common general knowledge as at the priority date of the application.

As discussed hereafter in more detail, the compression apparatus according to the example embodiments is particularly applicable to compression of a tubular structure in construction of an elongate hollow structure such as a pipe as described and illustrated in the Applicant's international application PCT/AU2011/001401, the contents of which are incorporated herein by way of reference. Accordingly, the example embodiments will primarily be discussed in relation to a compression apparatus for use in construction of such an elongate hollow structure.

However, it should be understood that the invention may have application to the construction of various other hollow bodies, including, for example, pipes, ducts, tubes and other tubular elements, tubular structural elements such as shafts, beams and columns, hollow bodies such as tanks, hull structures including such structures for aircraft, wind turbines, and other hollow elements of composite construction.

International application PCT/AU2011/001401 is directed to an elongate hollow structure in the form of a tubular element con FIG. d as a pipe and to a method of construction of the pipe on a continuous basis. The pipe is of composite construction, comprising a radially inner portion and a radially outer portion, with the two portions merging together to provide an integrated tubular wall structure. The inner portion is configured as an inner tube constructed from an inner liner with a layer of resin absorbent material adjacent one face thereof. The layer of resin absorbent material may be bonded to said face of the inner liner, although it need not necessarily be so. The outer portion is configured as an outer tube of fiber-reinforced composite construction surrounded by a flexible outer casing. More particularly, the outer tube comprises reinforcement impregnated in a resinous binder.

As part of the construction process, the inner and outer portions are assembled into a tubular structure, and the inner tube is progressively inflated along the tubular structure to give the form and shape to the assembled tubular structure. The inflation is achieved by introduction of an inflation fluid into the inner tube from the end thereof at which the construction process commenced. The inflation fluid may be of any appropriate form, such as, for example, air or water. The inflation pressure required to inflate the inner tube is relatively low; typically in the order of 5 to 30 psi or 0.3 to 2.0 bar. The inner tube and the assembled tubular structure are typically maintained in the inflated condition until such time as the resinous binder has hardened sufficiently to maintain the form and shape of the pipe, after which the inflation fluid can be released.

In order to inflate the inner tube and the assembled tubular structure, it is necessary to close the inner tube. This is done by locally compressing the assembled tubular structure to establish a closure zone at a location distal to an end from which the inflation fluid is introduced so that inflation fluid cannot pass through, and progressively moving the local compression along the tubular structure to progressively advance the closure zone along the inner tube.

In the arrangement disclosed in aforementioned PCT/AU2011/001401, the assembled tubular structure is subjected to such local compressing by passing the tubular structure through a compression device.

The compression device comprises two endless drives defining a passage through which the tubular structure can pass. The assembled tubular structure is compressed in the passage to define a choked zone which blocks the passage of inflation fluid further along the interior of the assembled tubular structure. The choked zone establishes the closure zone in the inner tube which is progressively advanced along the inner tube.

The two endless drives incorporate opposing elements such as cleats which cooperate to pinch the tube structure at intervals and close it against the passage of inflation fluid while allowing the impregnated resinous binder within the tube structure to pass through the choked zone. The section of the assembled tubular structure beyond the compression device is expanded by the inflation fluid, causing the assembled tube structure to expand both radially and axially, providing it with form and shape.

Further details regarding the construction of the pipe, and also the method by which it can be constructed, are set out in aforementioned PCT/AU2011/001401, the contents of which are incorporated herein by way of reference. While the compression device disclosed in aforementioned PCT/AU2011/001401 has proved to be effective, there are aspects of it which can be improved. It is against this background that the present invention has been developed.

SUMMARY

An example embodiment of the present invention is directed to a compression apparatus. The apparatus includes first and second sets of contact elements, each set of contact elements comprising a plurality of contact elements movable along a respective endless path having a linear path section. The contact elements in each set are in spaced relation with one another and disposed transversely to the direction of movement along the endless path, with the two linear path sections being in opposed relation to receive a tubular structure therebetween. The contact elements in the first and second sets are movable along the linear path sections in a coordinated sequence with respective contact elements being in registration in pairs, each pair defining a compression zone therebetween. The tubular structure is adapted to be compressed between pairs of opposed contact elements at spaced intervals corresponding to the compression zones along a portion of the length of the tubular structure. The apparatus further includes a mechanical coupling arranged between each pair of opposed contact elements of the first and second sets for causing the respective pairs of opposed contact elements to be maintained in registration with each other while moving along the opposed path sections Another example embodiment is directed to a compression apparatus. The apparatus includes first and second sets of contact elements, each set comprising a plurality of contact elements movable along a respective endless path having a linear path section. The contact elements in each set are disposed transversely to the direction of movement along the endless path, with the two linear path sections in opposed relation and adapted to receive a tubular structure therebetween. The contact elements in the first and second sets are movable along the linear path sections in a coordinated sequence with respective contact elements opposed to one another being in registration in pairs, each pair of opposed contact elements defining a compression zone therebetween. The apparatus further includes a mechanical coupling arranged between each pair of opposed contact elements of the first and second sets for causing the respective pairs of opposed contact elements to be maintained in registration with each other while moving along the opposed path sections. The contact elements further include elongate contact portions adapted for pressing engagement with the tubular structure.

Another example embodiment is directed to a method of constructing a hollow structure comprising a radially inner portion and a radially outer portion, with the two portions being assembled together to provide a tubular structure. In the method, the inner portion is expanded by injecting an inflation fluid into an end thereof. The tubular structure is then compressed at a location distal to the end from which the inflation fluid is introduced so that inflation fluid cannot pass through the location distal to the end. The compression of the tubular structure is caused by relative movement between the tubular structure and a compression section. The compression section further including a series of compression zones defined between pairs of opposed contact elements, with the pairs of opposed contact elements movable along linear path sections in a coordinated sequence, and each pair of opposed contact elements having a mechanical coupling arranged therebetween for causing the respective pairs of opposed contact elements to be maintained in registration with each other while moving along the linear path sections. The pairs of opposed contact elements present elongate contact portions adapted for pressing engagement with the tubular structure at spaced intervals to cause compression thereof. The pairs of opposed contact elements are maintained in registration with each other via the mechanical coupling while defining the compression zones.

Another example embodiment is directed to a method of constructing a hollow structure comprising a radially inner portion and a radially outer portion, with the two portions being assembled together to provide a tubular structure. In the method, the inner portion is expanded by injecting an inflation fluid into an end thereof. The tubular structure is then compressed at a location distal to the end from which the inflation fluid is introduced so that inflation fluid cannot pass through the location distal to the end. The compression of the tubular structure is caused by relative movement between the tubular structure and a compression section. The compression section further including a series of compression zones defined between pairs of opposed contact elements, with the pairs of opposed contact elements movable along linear path sections in a coordinated sequence, and each pair of opposed contact elements having a mechanical coupling arranged therebetween for causing the respective pairs of opposed contact elements to be maintained in registration with each other while moving along the linear path sections. The pairs of opposed contact elements present elongate contact portions adapted for pressing engagement with the tubular structure at spaced intervals to cause compression thereof. The elongate contact portion of at least one of each pair of opposed contact elements is compliant.

Another example embodiment is directed to a compression apparatus. The apparatus includes first and second sets of contact elements. Each set comprises a plurality of contact elements movable along a respective endless path having a linear path section, the contact elements in each set disposed transversely to the direction of movement along the endless path, with the two linear path sections in opposed relation to receive a tubular structure therebetween. The contact elements in the first and second sets are movable along the linear path sections in a coordinated sequence with respective contact elements in registration in pairs, each pair defining a compression zone therebetween, whereby the tubular structure is adapted to be compressed between pairs of opposed contact elements corresponding to the compression zones along a portion of the length of the tubular structure. The apparatus further includes electronic registration means for causing the respective pairs of opposed contact elements to be maintained in registration with each other while moving along the opposed path sections.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 4 is a schematic fragmentary perspective view showing a compression area of the compression apparatus, with a tubular structure undergoing compression at spaced intervals within the compression area.

FIG. 5 is a schematic fragmentary cross-sectional view showing upper and lower contact elements in registration, with the tubular structure being compressed at a compression zone defined between the two contact elements.

FIG. 9 is a view similar to FIG. 5, except that one of the two cooperating contact elements of each pair has the contact portion thereof being compliant.

FIG. 10 is a schematic side view of the arrangement shown in FIG. 9.

FIG. 11 also view similar to FIG. 5, except that it depicts an arrangement in which both of the cooperating contact elements of each pair have the contact portions thereof being compliant.

FIG. 12 is a schematic end view of an example of another form of contact element having a compliant contact portion.

FIG. 13 is a is a schematic end view of a pair of contact elements, with the upper compression element having a rigid contact portion and the lower compression element having a compliant contact portion and being of the construction shown in FIG. 12.

FIG. 14 is a schematic end view of a pair of contact elements, with each contact element having a compliant contact portion and being of the construction shown in FIG. 12.

FIG. 15 is a schematic a schematic side elevation of a compression apparatus according to another example embodiment, with the compression device having a support structure for supporting that portion of the tubular structure exiting a compression area of the compression apparatus.

FIG. 16 is a schematic view of a guide structure for guiding movement of the tubular structure towards and over the support structure, and also a perforation system for perforating the tubular structure to provide vents.

DETAILED DESCRIPTION

Figure 1:
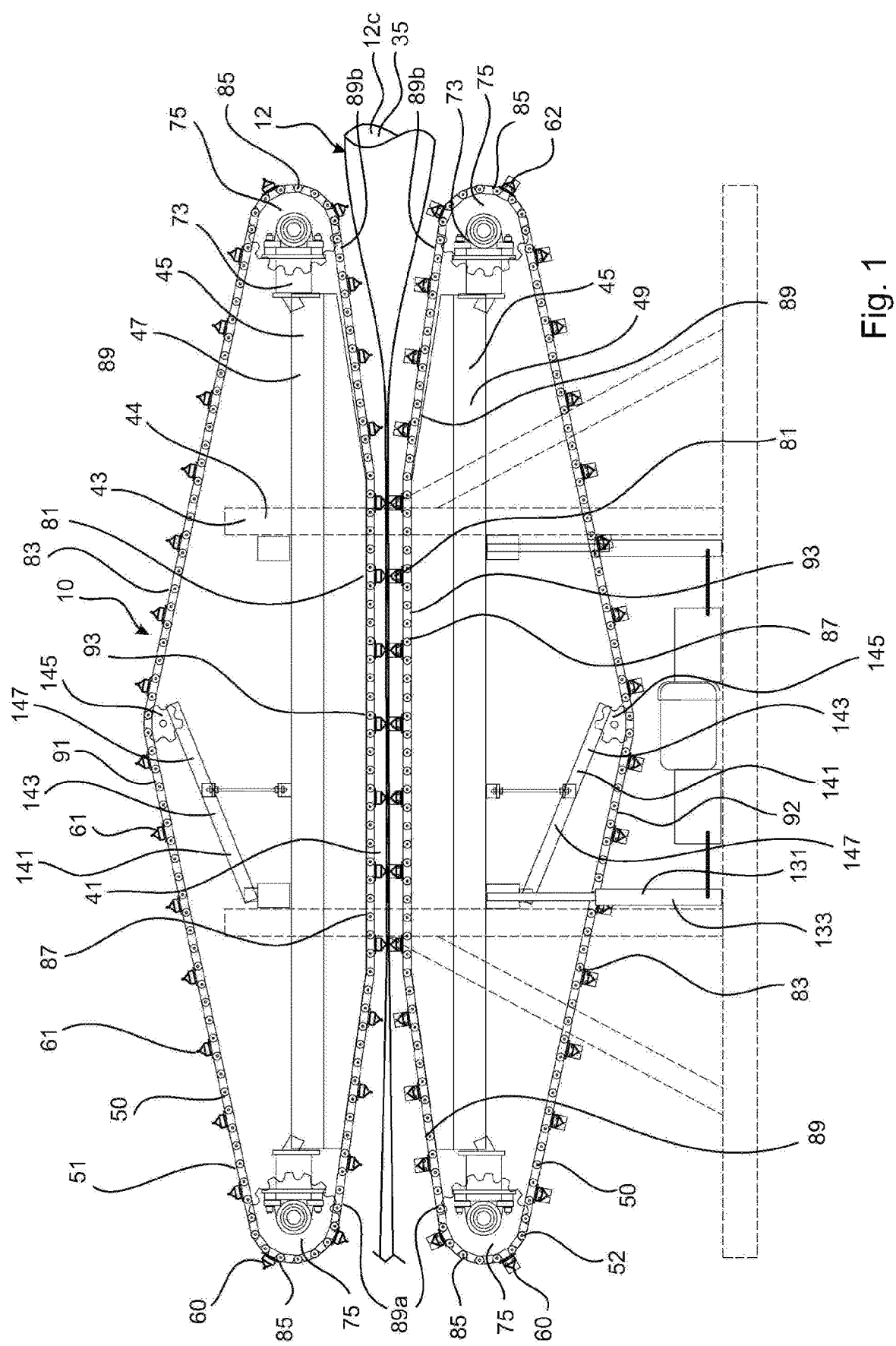
FIG. 1 is a schematic side elevation of a compression apparatus according to an example embodiment.

As to be described in more detail hereafter, the example embodiments of the present invention relate to.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

Reference to positional descriptions, such as "upper", "lower", "inner" and "outer", are to be taken in context of the embodiments depicted in the drawings, and are not to be taken as limiting the invention to the literal interpretation of the term but rather as would be understood by the skilled addressee.

Additionally, where the terms "system", "device", and "apparatus" are used in the context of the example embodiments, they are to be understood as including reference to any group of functionally related or interacting, interrelated, interdependent or associated components or elements that may be located in proximity to, separate from, integrated with, or discrete from, each other.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

An example embodiment according to the present invention, to be described hereafter in detail, is directed to a compression apparatus. The apparatus has first and second sets of contact elements, each set further comprising a plurality of contact elements movable along a respective endless path having a linear path section. The contact elements in each set are in spaced relation to one another and disposed transversely to the direction of movement along the endless path. The two linear path sections are thus in opposed relation to one another to receive a tubular structure therebetween.

The contact elements in each set move along their linear path sections in a coordinated sequence with respective opposed contact elements being in pairs, each pair defining a compression zone therebetween. The tubular structure is to be compressed between the pairs at spaced intervals corresponding to the compression zones. A registration means causes the pairs to be maintained in registration with each other while moving along the opposed path sections.

In an example, each set of contact elements may be mounted on or incorporated in a carrier structure adapted to convey the contact elements along the endless path. The carrier structure may comprise an endless carrier structure such as, for example, an endless chain assembly, an endless band assembly or an endless belt assembly. Each endless chain assembly may comprise two endless chain structures between which the contact elements are supported. In an example, each endless carrier structures may have a common drive system for driving the two carrier structures in unison.

In an example, there may be provision for braking or retarding movement of the compression apparatus relative to the tubular structure. Such provision may comprise means for braking or retarding movement of the endless carrier assembly. This provision may be incorporated in the common drive system.

Each endless chain structure may pass around a series of sprockets at least one of which comprises a drive sprocket for driving the endless chain structure, the drive sprocket being integrated in the common drive system. Additionally, an adjustment system may be provided for tensioning each endless chain assembly.

In an example, the contact elements may include elongate contact portions for pressing engagement with the tubular structure. Each elongate contact portion may be configured to present a contact edge extending transversely to the path section. Each contact element may be of any appropriate form, such as for example a rod, bar, cleat or roller. Additionally, each contact element may be of angular cross-section to define an elongate contact edge.

With this arrangement, each compression zone is defined between two elongate contact edges defined by the opposed contact elements in registration. This is useful as it affords imposition of a localized concentrated pressing action on the tubular structure at the respective compression zone.

In one arrangement, the registration means may comprise a mechanical registration system. The mechanical registration system may comprise a mechanical coupling between the first and second sets of contact elements. Additionally, the mechanical coupling may comprise counterpart registration elements on respective pairs of opposed contact elements. There may be counterpart registration elements on all respective pairs of opposed contact elements or on only some of respective pairs of opposed contact elements. In the latter case, it is desirable that counterpart registration elements on at least one respective pair of opposed contact elements passing along the path section are in cooperation at any one time.

The counterpart registration elements may further comprise mating elements. In one embodiment, the counterpart registration elements comprise at least one registration pin and a mating registration slot, the registration pin being receivable in the mating registration slot to establish registration between the respective pair of opposed contact elements.

In another arrangement, the registration means may comprise an electronic registration system. The electronic registration system may comprise an electronic coupling between the first and second sets of contact elements operable to drive the contact elements synchronously. In an example, the electronic registration system may comprise an electronic control system for controlling drive imparted to the two carrier structures whereby the two carrier structures are driven synchronously. In an embodiment, the electronic control system may control drive motors for driving the two endless chain assemblies. The drive motors may comprise electric motors, for example. The drive motors may be integrated in the common drive system for driving, and optionally also braking, the two endless chain structures within the respective endless chain assembly.

Another example embodiment to be described hereafter in more detail is similar to the previous embodiment, but does not include the registration means as above, and further specifies that one or more of the contact elements may include elongate contact portions adapted for pressing engagement with the tubular structure.

Each elongate contact portion may be configured to present a contact edge extending transversely to the path section. Also, each contact element may be of angular cross-section to define an elongate contact edge.

The compression apparatus according to the above embodiments may have at least some of the contact elements adapted to provide rigid contact with the tubular structure when in engagement therewith, or at least some of the contact elements adapted to provide compliant contact with the tubular structure when in engagement therewith. With such an arrangement, at least one of the contact elements may have a contact portion for engaging the tubular structure, the contact portion being compliant.

The complaint nature of the contact portion of at least one of the contact elements can accommodate irregularities in the surface of the tubular structure with which it is in engagement. In particular, the compliant contact portion is deformable in response to a compression loading as the tubular structure is compressed. The deformation serves to accommodate irregularities in the surface of the tubular structure.

In one arrangement, only one of the two cooperating contact elements in each pair has the contact portion thereof being compliant. In another arrangement both of the cooperating contact elements in each pair have the respective contact portions thereof being compliant. The contact portion may be of resilient construction or may comprise resilient material in order to be compliant.

The compression apparatus according to above embodiments may further comprise a support structure for supporting that portion of the tubular structure exiting a compression area defined between the respective contact elements when in registration in pairs.

Another example embodiment to be described hereafter in more detail is directed to a method of constructing a hollow structure comprising a radially inner portion and a radially outer portion, with the two portions being assembled together to provide a tubular structure. In the method, the inner portion is expanded by injecting an inflation fluid into an end thereof. The tubular structure is then compressed at a location distal to the end from which the inflation fluid is introduced so that inflation fluid cannot pass through the location distal to the end. The compression of the tubular structure is caused by relative movement between the tubular structure and a compression section. The compression section further including a series of compression zones defined between pairs of opposed contact elements, the pairs of opposed contact elements presenting elongate contact portions adapted for pressing engagement with the tubular structure at spaced intervals to cause compression thereof. The pairs of opposed contact elements are maintained in registration with each other while defining the compression zones.

While the above method includes a step of causing relative movement between the tubular structure and the compression area, it should be understood that there is no relative movement between the tubular structure and the series of compression zones which are defined between pairs of opposed contact elements and which are within the compression area. In other words, the contact elements when in pressing engagement with the tubular structure do not move relative to the tubular structure, but rather undergo movement relative to the compression area in unison with the tubular structure.

Another example embodiment to be described hereafter in more detail is directed to a method of constructing a hollow structure that includes the expanding and compressing steps above, but specifies that an elongate contact portion of at least one of each pair of opposed contact elements is compliant, instead of specifying that the pairs of opposed contact elements being maintained in registration with each other while defining the compression zones.

The relative movement between the tubular structure and a compression area may take various forms. In one arrangement, the pairs of opposed contact elements with elongate contact portions for pressing engagement with the a tubular structure at spaced intervals to cause compression thereof;

that is, the compression area may be defined by a compression apparatus which may be stationary and the tubular structure may move through the compression apparatus. In another arrangement, the compression area may advance along the tubular structure; that is, the tubular structure may be stationary and the compression apparatus may move along it. In yet another arrangement, both the compression apparatus and the tubular structure may move in a manner whereby the tubular structure passes through the compression area defined within the compression apparatus.

In each case, the pairs the contact elements having elongate contact portions thereof in pressing engagement with the tubular structure at spaced intervals (to cause compression thereof) move in unison with the tubular structure relative to the compression area. In other words, the contact elements when in pressing engagement with the tubular structure do not move relative to the tubular structure but rather undergo movement relative to the compression area in unison with the tubular structure. Further, at least one of the contact elements in each pair may have the contact portion thereof being compliant.

A further example method of constructing a hollow structure described hereafter is similar to the first method above, including the expanding and compressing steps above, but instead of specifying maintaining the registration of pairs, this method further specifies that the pairs of opposed contact elements have elongate contact portions for pressing engagement with the tubular structure at spaced intervals to cause compression thereof. In a variant, an elongate contact portion of at least one of each pair of opposed contact elements is compliant.

Further details regarding the construction of the hollow structure, as well as a radially inner portion and a radially outer portion which are assembled together to provide the tubular structure, and also the method of construction, are set out in the aforementioned PCT/AU2011/001401, the contents of which are incorporated herein by way of reference.

Another example embodiment is directed to a compression apparatus similar to the first two embodiments with regard to the makeup of the first and second sets of contact elements as a plurality of contact elements movable along a respective endless path having a linear path section, in spaced relation with one another and disposed transversely to the direction of movement along the endless path, with the two linear path sections being in opposed relation to receive a tubular structure therebetween. The contact elements in the sets also move in a coordinated sequence with respective contact elements opposed to one another in pairs, each pair defining a compression zone therebetween, Here in this embodiment, at least one of the contact elements has a contact portion for engaging the tubular structure passing through the compression apparatus, the contact portion being compliant.

In one arrangement according to this embodiment, only one of the two cooperating contact elements in each pair has the contact portion thereof being compliant. In another arrangement both of the cooperating contact elements in each pair have the respective contact portions thereof being compliant. Further, the contact portion may be of resilient construction or may comprise resilient material in order to be compliant.

In another example according to this embodiment, a set of contact elements may be mounted on or incorporated in a carrier structure adapted to convey the contact elements along the endless path. The carrier structure may comprise an endless carrier structure such as, for example, an endless chain assembly, an endless band assembly or an endless belt assembly.

According to this embodiment contact elements may be configured to present elongate contact portions for pressing engagement with the tubular structure. Each elongate contact portion may be configured to present a contact edge extending transversely to the path section. Also, each contact element may be of any appropriate form, such as a rod, bar, cleat or roller. Further, each contact element may be of angular cross-section to define an elongate contact edge.

With this arrangement, each compression zone is defined between two elongate contact edges defined by the opposed contact elements in registration. This is useful as it affords imposition of a localized concentrated pressing action on the tubular structure.

The compression apparatus of this embodiment may further comprise a support structure for supporting that portion of the tubular structure exiting a compression area defined between the respective contact elements when in registration in pairs. In an example, the support structure is configured to maintain said portion of tubular structure in general alignment with the path followed by the tubular structure through the compression area. With this arrangement, the support structure is operable to provide support for said portion of the tubular until such time as it is sufficiently clear of the lower endless chain assembly to avoid contact therewith.

In an example, the support structure may comprise a support bed disposed adjacent the exit end of the compression apparatus and so positioned to receive and support the exiting portion of tubular structure on the underside thereof. The support structure may comprise a roller conveyor in which various roller cooperate to define the support bed.

Another example embodiment is directed to a compression apparatus similar to the first three apparatus embodiments with regard to the makeup of the first and second sets of contact elements as a plurality of contact elements movable along a respective endless path having a linear path section, in spaced relation with one another and disposed transversely to the direction of movement along the endless path, with the two linear path sections being in opposed relation to receive a tubular structure therebetween. The contact elements in the sets also move in a coordinated sequence with respective contact elements opposed to one another in pairs, each pair defining a compression zone therebetween, Here in this embodiment, there is included a support structure for supporting that portion of the tubular structure exiting a compression area defined between the respective contact elements when in registration in pairs.

In this embodiment, the support structure is configured to maintain the portion of tubular structure in general alignment with the path followed by the tubular structure through the compression area. With this arrangement, the support structure is operable to provide support for the portion of the tubular structure until such time as it is sufficiently clear of the lower endless chain assembly to avoid contact therewith.

For this embodiment, the support structure may comprise a support bed disposed adjacent the exit end of the compression apparatus and so positioned to receive and support the exiting portion of tubular structure on the underside thereof. The support structure may comprise a roller conveyor in which various roller cooperate to define the support bed.

The exiting portion of tubular structure may be guided in its movement with respect to the support structure. For example, the exiting portion of tubular structure may be guided in its movement towards and over the support structure.

Also, the guided movement may be provided by a guide structure for controlling the position of the exiting portion of tubular structure. The guide structure may define a guide path through which the exiting portion of tubular structure can moved in a guided manner. The guide path may be located adjacent the support structure. In one arrangement, the guide structure is located adjacent the support structure at the end thereof remote from the compression apparatus. With this arrangement, the exiting portion of tubular structure passes beyond the support structure before encountering the guide structure. In an example, the guide structure may comprise a base roller and two side rollers which cooperate to define the guide path.

Figure 6:
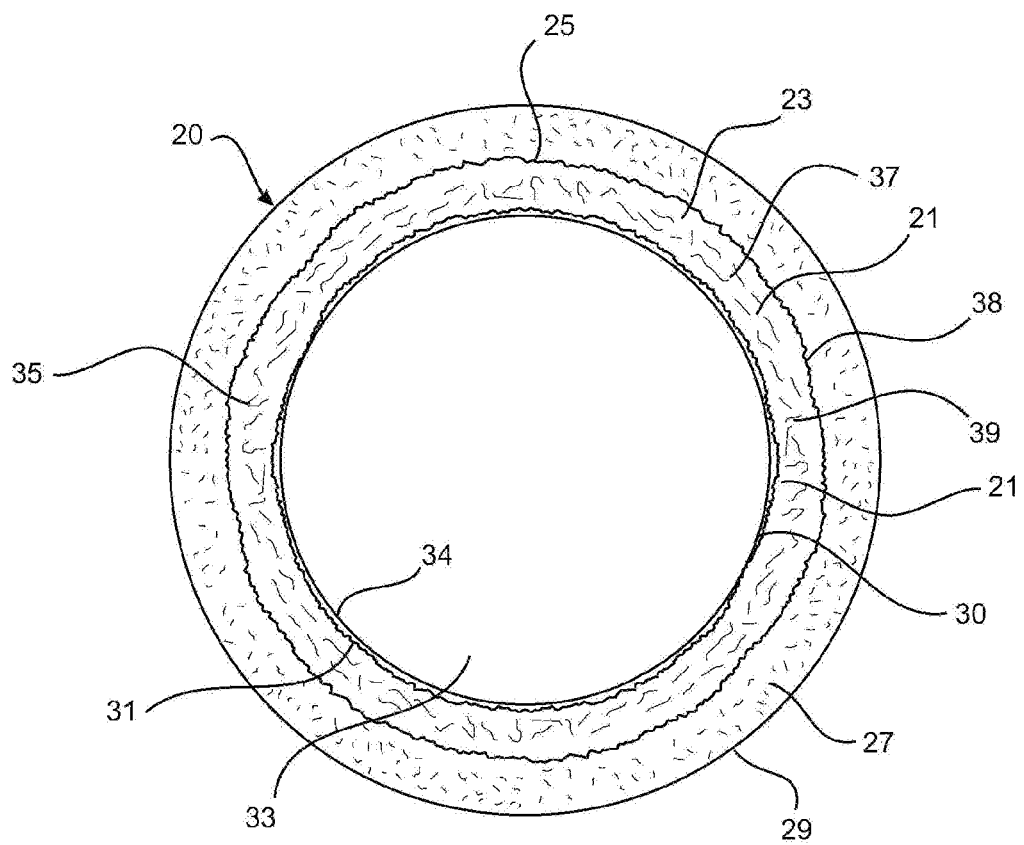
FIG. 6 is a schematic cross-sectional view of a hollow structure constructed from the tubular element subsequent to compression thereof in the compression apparatus.

Referring to FIGS. 1 to 5, there is shown a compression apparatus 10 for compressing a tubular structure 12 which is ultimately formed into a hollow structure 20. An example of such a tubular structure 20 so formed is shown in FIG. 6. In the arrangement shown in FIG. 6, the hollow structure 20 is in the form of a tubular element configured as a pipe. The pipe 20 is of composite construction, comprising a radially inner portion 21 and a radially outer portion 23, with the two portions 21, 23 merging together to provide an integrated tubular wall structure 25.

In the arrangement illustrated, the outer portion 23 is encased within a protective sheath 27 comprising a hardenable composition such as cement or concrete contained by an outermost skin 29 of any suitable material, such as geotextile cloth. The protective sheath 27 is intended to afford protection to the pipe 20 against compression loading to which it might be exposed once in the installed condition. However, it likely that the protective sheath 27 will not be employed in many instances; for example, in underground applications. In other applications, such as for example exposed application (above ground for instance) and in marine applications, the protective sheath 27 may provide a primary surface.

The inner portion 21 comprises a tube 30. Prior to formation of the integrated tubular wall structure 25 of the pipe 20, the tube 30 defines an inflatable bladder 31 having an inflation cavity 33. With this arrangement, the tube 30 can be caused to undergo radial expansion upon inflation of bladder 31 by introduction of an inflation fluid such as, for example, air or water. The inflation pressure required to inflate the tube 30 is relatively low; typically in the order of 5 to 30 psi or 0.3 to 2.0 bar. Upon formation of the integrated tubular wall structure 25, the tube 30 also defines the interior wall 34 of the pipe 20.

The outer portion 23 is configured as an outer tube 35 of fiber-reinforced composite construction surrounded by a flexible outer casing 38. Namely, the outer tube 35 comprises reinforcement 37 impregnated in a resinous binder. The flexible outer casing 38 is disposed around the outer tube 35 to contain the resinous binder prior to curing thereof. The flexible outer casing 38 may be formed of any appropriate material, including for example polyethylene. The outer casing 38 may remain in place and ultimately form an integral part of the pipe 20, or it may be subsequently removed after having served its purpose.

The outer casing 38 may comprise an outer layer of polyethylene or TPU or PVC, and a fibrous layer bonded onto one face thereof, the arrangement being that the fibrous layer confronts the reinforcement 37. The fibrous layer may provide a breather layer and may also be ultimately impregnated with the resinous binder for integration of the assembly. The resinous material which provides the resinous binder may be of any appropriate type; a particularly suitable resinous material may comprise thermosetting resin such as epoxy vinyl ester or other suitable resin and thermoplastic resin systems.

The reinforcement 37 may comprise one or more layers of reinforcing fabric, each layer being configured as a tubular layer disposed about the tube 30. The reinforcing fabric preferably comprises reinforcing fabric which incorporates reinforcement fibers featuring quadraxial fiber orientations. The quadraxial fiber orientations offer the necessary hoop and axial stress bearing properties to the pipe. The reinforcement fibers may comprise glass fibers.

The flexible outer casing 38 serves to resist radial expansion of the reinforcing fabric tubular layers (which constitute the reinforcement 37) upon radial expansion of the tube 30, thereby causing the reinforcement 37 to be subjected to radial compression. With this arrangement, the reinforcement 37 is confined in the space 39 between the expanding tube 30 and the flexible outer casing 38. Specifically, the radially expanding tube 30 operates in conjunction with the flexible outer casing 38 to confine the reinforcement 37 and also causes the volume of the space 39 in which the reinforcement is confined to progressively decrease. This forces the resinous binder within the reinforcement 37 to fully impregnate the reinforcement; that is, the layers of reinforcing fabric configured as the tubular layers which constitute the reinforcement become fully "wetted-out". In particular, it provides a compaction force to the reinforcement 37 and effectively pumps the resinous binder through the layers of reinforcing fabric to distribute the resinous binder within the space 39 in a controlled and constrained manner. The resinous binder is caused to move through the reinforcement 37 within the space 39 as a progressively rising resin pool as a consequence of the progressively decreasing volume of the space 39. In this process, the step of delivering resinous binder to the reinforcement 37 and the step of fully wetting out the reinforcement with the resinous binder are separate and distinct actions.

Further, the progressive decrease in volume of the space 39 in which the reinforcement 37 is confined, acts to positively expel air from within the space 39 which has the effect of enhancing impregnation of the resinous binder within the reinforcement. The outer casing 38 and the various reinforcing fabric tubular layers which constitute the reinforcement 37 may be adapted to facilitate the expulsion of the air. By way of example, the breather layer defined by the fibrous inner layer of the outer casing 38 may facilitate this expulsion of air. Further, interstices within the reinforcing fabric tubular layers which constitute the reinforcement may provide pathways for air expulsion. Still further, the outer casing 38 and possibly also some of the various reinforcing fabric tubular layers may, for example, incorporate vents at intervals along their respective lengths to facilitate expulsion of the air. In one arrangement, the vents may comprise perforations, such as puncture holes, formed in the outer casing 38. With such an arrangement, the perforations are ultimately sealed by the resinous binder to ensure the sealed integrity of the pipe 20. In another arrangement, the vents may comprise ports inserted in the outer casing 38 and the various reinforcing fabric tubular layers which constitute the reinforcement 37. The ports may, for example, comprise tubular inserts formed of a material which dissolves or otherwise degrades upon exposure to the resinous binder. With such an arrangement, the apertures in which the ports were accommodated are ultimately sealed by the resinous binder to ensure the sealed integrity of the pipe 20.

The flexible outer casing 38 may have some resilience in order to yieldingly resist radial expansion of the reinforcing fabric tubular layers which constitute the reinforcement 37, at least to some extent. In this way, the flexible outer casing 38 can cushion the initial stage of the radial expansion of the reinforcing fabric tubular layers. In particular, it is desirable that the flexible outer casing 38 have some elasticity; for example, elasticity in the range of about 1% to 10%. The flexible outer casing 38 may have some elasticity for the purpose of enhancing control of the rate at which the progressively rising pool of resinous binder progressively wets the reinforcement 37. Control of the rate at which the progressively rising pool of resinous binder progressively wets the reinforcement 37 is desirable. If, for example, the resinous binder rises within the space 39 too rapidly, it may be that full wet-out of fibers in the reinforcement 37 might not be achieved. If, on the other hand, the resinous binder rises within the space 39 too slowly, it may be that the resinous binder could commence to cure before full wet-out of fibers in the reinforcement 37 is achieved.

The elastic nature of the flexible outer casing 38 installed around the assembled around the reinforcement 37 functions somewhat as a girdle for controlling external pressure exerted on the rising pool of resinous binder. The elastic characteristic of the flexible outer casing 38 is selected to achieve the desired rate of wet-out. The elastic force exerted by the outer casing 38 provides some counterbalancing of the tension exerted by the inflating bladder 31 defined by the tube 30.

The inflatable bladder 31 is typically maintained in the inflated condition until such time as the resinous binder has hardened sufficiently to maintain the form and shape of the pipe 20, after which the inflation fluid can be released from the inflation cavity 33. The pipe 20 is thus formed, with the tube 30 defining the central flow passage within the pipe.

In order to inflate the inner tube 30 and the assembled tubular structure 12, it is necessary to close the inner tube 30. This is done by locally compressing the assembled tubular structure 12 to establish a closure zone at a location distal to an end from which the inflation fluid is introduced so that inflation fluid cannot pass through, and progressively moving the local compression along the tubular structure to progressively advance the closure zone along the inner.

The compression of the assembled tubular structure 12 to establish a closure zone is performed using a compression apparatus 10 by passing the tubular structure through a compression area defined by a compression section 41 within the compression apparatus 10. The manner in which the tubular structure 12 passes through compression section 41 defined within the compression apparatus 10 may depend upon the manner in which the pipe 20 is constructed. In one arrangement, the assembled tubular structure 12 may advance through the compression section 41: that is, the compression apparatus 10 may be stationary and the tubular structure 12 may move through the compression apparatus. In another arrangement, the compression apparatus 10 may advance along the tubular structure 12; that is, the tubular structure 12 may be stationary and the compression apparatus 10 may move along it. In yet another arrangement, the compression apparatus 10 and the tubular structure 12 may both move one relative to the other, with the relative movement being in a manner whereby the tubular structure 12 passes through the compression section 41.

In addition to closing the inner tube 30 so that inflation fluid cannot pass through, the compression apparatus 10 may act to control the rate at which the pipe 20 is constructed. Further, the compression apparatus 10 and the tubular structure 12 may cooperate in a manner whereby traction is exerted therebetween.

The compression apparatus 10 may exert traction on the tubular structure 12 to facilitate construction of the pipe 20. The traction may involve the imparting of drive between the tubular structure 12 and the compression apparatus 10 to cause relative movement therebetween, particularly at the start of the pipe construction process.

In certain circumstances, however, there may not be a need for traction to provide drive between the tubular structure 12 and the compression apparatus 10. This would typically be so when forces generated on the tubular structure 12 by the pressure of the inflation fluid within the inflation cavity 33 at the end of the tubular structure closed by the compression apparatus 10 is at a level sufficient for the progressively expanding section of the tubular structure 12 adjacent the closed end to urge the compression apparatus 10 to advance along the tubular structure 12; more particularly, to urge the compression apparatus 10 to advance along that section of the tubular structure 12 which is in a collapsed (un-inflated) condition and which is ahead of the expanded (inflated) section of the tubular structure 12. In other words, the pressure of the inflation fluid within the inflation cavity 33 drives the compression apparatus 10 to advance along that section of the tubular structure 12 which is in a collapsed (un-inflated) condition immediately head of the expanded (inflated).

In such circumstances, there is a possibility that the forces generated by the progressively expanding section of the tubular structure 12 adjacent the closed end are such as to urge the compression apparatus 10 to advance too rapidly along that collapsed (un-inflated) section of the tubular structure 12. If this is the case, there may be a need to control movement of the compression apparatus 10 along that collapsed (un-inflated) section of the tubular structure 12. This may involve retardation of movement of the compression apparatus 10 along that collapsed (un-inflated) section of the tubular structure 12. The movement of the compression apparatus 10 along that collapsed (un-inflated) section of the tubular structure 12 may be retarded by operation of a braking system (not shown).

A typical scenario might be that traction is used to impart drive between the tubular structure 12 and the compression apparatus 10 at the start of the pipe construction process to commence movement of the compression apparatus 10 along the collapsed tubular structure 12. Subsequently, once movement of the compression apparatus in underway, the movement of the compression apparatus 10 along the collapsed tubular structure 12 is continued through utilization of forces generated by the progressive expansion of the section of the tubular structure 12 adjacent the closed end thereof under the influence of the inflation fluid.

It is desirable to control the rate of relative movement between the compression apparatus 10 and the tubular structure 12 in order to provide a production process that is consistent, manageable and reliable. For instance, it is desirable to have control of the rate at which the progressively rising pool of resinous binder within the tubular structure 12 progressively wets the reinforcement 37, as previously discussed. If, on the one hand, the resinous binder rises within the tubular structure in space 39 too rapidly, it may be that full wet-out of fibers in the reinforcement 37 is not achieved. If, on the other hand, the resinous binder rises within the space 39 too slowly, it may be that the resinous binder could commence to cure before full wetout of fibers in the reinforcement 37 is achieved.

Further details regarding the construction of the pipe 20, and also the method by which it can be constructed, are set out in aforementioned PCT/AU2011/001401, the contents of which are incorporated herein by way of reference.

The compression apparatus 10 comprises a frame structure 43 comprising a primary frame 44 and two secondary frames 45 which are mounted on the primary frame 44 and which are disposed in opposed relation to each other. In the arrangement shown the two secondary frames 45 are in opposed relation by being one above the other, thereby providing upper frame 47 and lower frame 49.

The upper frame 47 is fixed with respect to the primary frame 44 and the lower frame 49 is selectively movable relative to the primary frame 44. With this arrangement, the lower frame 49 is selectively movable relative to the upper frame 47 to provide adjustment of the compression section 41, as will be described in more detail later. A reverse configuration may be possible; that is, lower frame 49 may fixed with respect to the primary frame 44 and the upper frame 47 selectively movable relative to the primary frame 44.

The secondary frames 45 support two endless carrier structures 50 comprising an upper carrier structure 51 supported on the upper frame 47 and a lower carrier structure 52 supported on the lower frame 49.

The carrier structures 50 carry contact elements 60 arranged in two sets, being an upper set 61 carried on the upper carrier structure 51 and a lower set 62 carried on the lower carrier structure 52. In the arrangement shown, the carrier structures 50 are configured as endless chain assemblies, comprising upper endless chain assembly 51 and lower endless chain assembly 52. With this arrangement, the endless chain assemblies 50 provide the carrier structures for carrying the contact elements 60. It should, however, be understood that the carrier structures may take other appropriate forms, such as for example an endless band assembly or an endless belt assembly.

The carrier structures 50 are operable to move the contact elements 60 in the two sets 61, 62 along the compression section 41 in a coordinated sequence, with respective contact elements being in registration in pairs 63, as best seen in FIG. 5, where one contact element form each pair 63 is identified by reference number 60a and the other is identified by reference numeral 60b. Each pair 63 defines a compression zone 65 therebetween, whereby the portion 12a of the tubular structure 12 within the compression section 41 is compressed between the pairs 63 of opposed contact elements at spaced intervals 67 which correspond to the compression zones 65. Typically, there is a gap 68 between the two contact elements 60a, 60b constituting each pair 63, with the gap 68 defining the compression zone 65. In this embodiment, the gaps 68 are selectively variable in size, as will be explained in more detail later. The variation in the size of the gaps 68 allows the compression apparatus 10 to accommodate tubular structures 12 of various thicknesses, and to also allow the extent of compression imposed upon a particular tubular structure to be selectively adjusted as required.

Each endless chain assembly 50 comprise two endless chain structures 71 between which the contact elements 60 are supported. Only one endless chain structure 71 within each endless chain assembly 50 is shown in the drawings.

Figure 2:
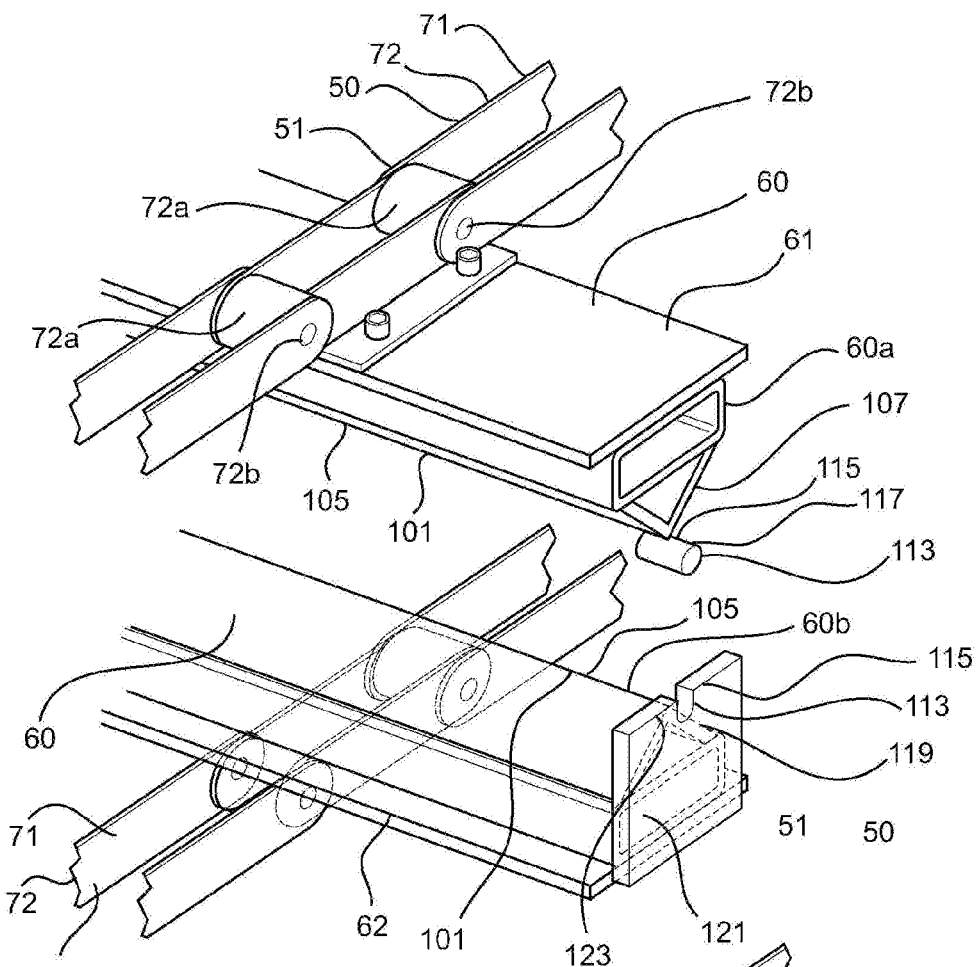
FIG. 2 is a schematic fragmentary perspective view showing upper and lower contact elements moving into registration.
Figure 3:
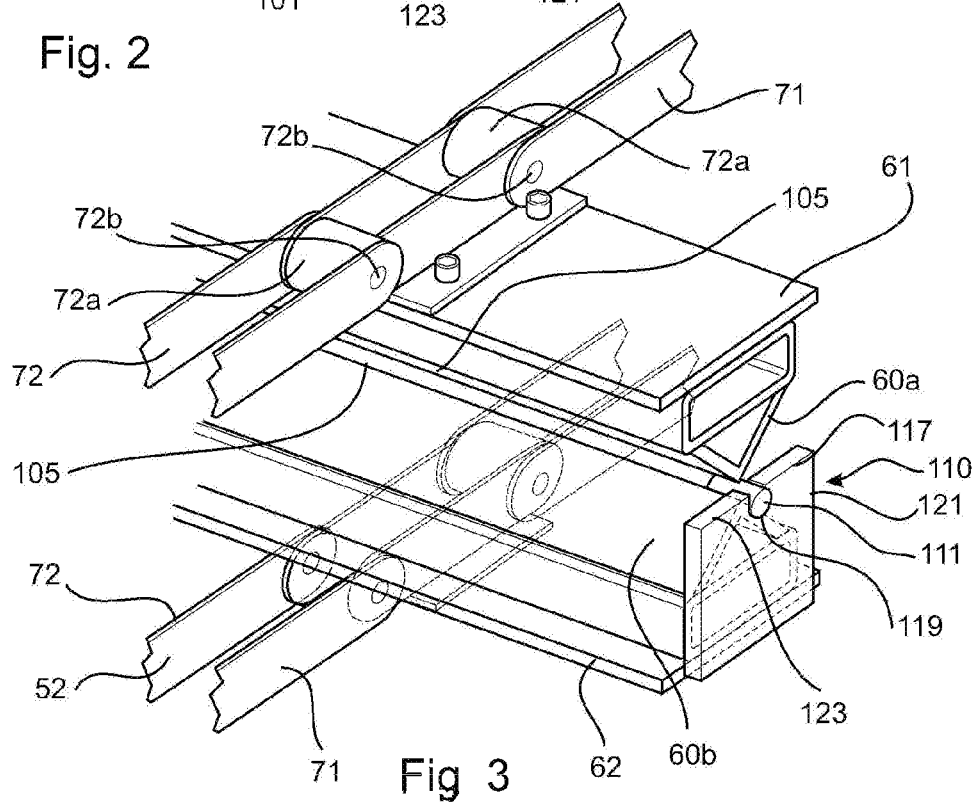
FIG. 3 is a view similar to FIG. 2 except that the two contact elements are shown in registration a fragmentary view of an internal portion of the separation system.

The endless chain structures 71 comprise conveyor roller chains 72 having chain rollers 72a which are adapted to carry the compression forces of the contact elements 60 and transfer those forces from the contact elements to underlying support structures forming part of the frame structure 43 via the rolling assemblies of the chain rollers. The base support structure (not shown) for each endless chain structure 71 comprises a track or chain way. The chain rollers 72a and attachment to the endless chains 72 are configured so that the load point of each contact element 60 (at which the contact element engages the tubular structure 12) is positioned between two roller carriers 72b, as depicted in FIGS. 2 and 3. In this way, the contact element 60 is held on a "carriage" of rollers to prevent tipping, and the load is transferred through the rollers 72a to the base support structure, thereby minimizing drag on the chain and friction on the track or chain way. In this way the endless chain structures 71 can move through the compression section 41 with minimal resistance.

Each endless chain assembly 50 has a common drive system 73 for driving the two endless chain structures 71 in unison. The common drive system 73 may incorporate the braking system for selectively retarding movement of the compression apparatus 10 along the collapsed (un-inflated) section of the tubular structure 12, as previously described.

In one arrangement, the two endless chain assemblies 50 are arranged and driven in a sprocketed roller chain arrangement. Alternatively a v-belt drive or a synchronous belt drive can be used in place of the roller chain arrangement as would be understood by the skilled addressee.

Each endless chain structure 71 passes around a series of sprockets 75, at least one of which comprises a drive sprocket for driving the endless chain structure. The drive sprocket is integrated in the common drive system 73. With this arrangement, the common drive systems 73 of the upper endless chain assembly 51 and the lower endless chain assembly 52 are separate from each other, but each common drive system 73 drives and brakes the two endless chain structures 71 within each endless chain assembly in unison.

Each endless carrier structure 50 is operable to move around an endless path which comprises an inner run 81, an outer run 83 and two opposed end runs 85. Each inner run 81 includes a linear run section 87, and transition sections 89 at opposed ends of the linear run section 87. With this arrangement, the upper carrier structure 51 is operable to circulate the upper set 61 of contact elements 60 about an upper endless path 91 and the lower carrier structure 52 is operable to circulate the lower set 62 of contact elements 60 about a lower endless path 92.

The upper and lower endless paths 91, 92 around which the contact elements 60 are circulated each includes a linear path section 93 corresponding to the linear run section 87 of the respective endless carrier structure 50. The linear run sections 87 extend along the compression section 41 and are in opposed relation to receive the tubular structure 12 therebetween, whereby the portion 12a of the tubular structure 12 within the compression section 41 is compressed between the pairs 63 of opposed contact elements 60.

There is no relative movement between the portion 12a of the tubular structure 12 and the pairs 63 of opposed contact elements 60 during this compression stage within the compression section 41. This is because the respective pairs 63 of opposed contact elements 60 in pressing engagement with the portion 12a of the tubular structure 12 within the compression section 41 move in unison or concert with the tubular structure 12 within the compression section 41. In each case, the pairs 63 of contact elements 60 in pressing engagement with the tubular structure 12 at spaced intervals (to cause compression thereof) move within the compression section 41 in unison with the tubular structure 12. In other words, the contact elements 60 when in pressing engagement with the tubular structure 12 do not move relative to the tubular structure but rather undergo movement relative to the compression section 41 in unison with the tubular structure.

The contact elements 60 in each set 61, 62 are in spaced relation and are disposed transversely to the direction of movement along the endless path 91, 92. The contact elements 60 are configured to present elongate contact portions 101 for pressing engagement with the tubular structure 12. Each contact element 60 is supported between the two respective endless chain structures 71. The contact elements 60 extend beyond the two respective endless chain structures 71, whereby the ends of the contact elements are outboard of the endless chain structures 71.

In the arrangement shown, each contact element 60 comprises a bar assembly 103. Other configurations are of course possible, including for example an extruded element or a fabricated element configured for the purpose. The bar assembly 103 is of angular cross-section to define an elongate contact edge 105 which defines the contact portion 101. In particular, the bar assembly 103 comprises two longitudinal side faces 107 which taper inwardly towards each other to form the elongate contact edge 105. The two longitudinal faces 107 are defines by an elongate element 108 mounted on an elongate base element 109. The elongate element 108 and the elongate base element 109 are integrated to provide the bar assembly 103.

With this arrangement, each compression zone 65 is defined between two elongate contact edges 105 of the respective opposed contact elements 60 in registration. This is useful as it affords imposition of a localized concentrated pressing action on the tubular structure 12 at the compression zone 65 to close the inner tube 30 and thereby establish the fluid seal. The pressing action of each elongate contact edges 105 on the tubular structure 12 at the compression zone 65 is delivered as a line loading or point line loading, thereby providing the localized concentrated pressing action to close the inner tube 30 and thereby establish the fluid seal. In other words, the opposed contact elements 60 in registration each provide high pressure line loading or point line loading on opposed sides of the tubular structure 12. This has the effect of squeezing the tubular structure 12 between the opposed contact elements 60 to close the tubular structure at the compression zone 65 and thereby form the seal.

As mentioned above, the portion 12a of the tubular structure 12 within the compression section 41 at any time is simultaneously compressed at several compression zones 65 to close the inner tube 30 at several spaced locations and thereby establish a plurality of fluid seals. This arrangement is useful as any leakage at a first seal encountered by inflation fluid within the inner tube 30 is likely to be stopped by a subsequent seal downstream. Further, compression of the tubular structure 12 at spaced intervals 67 facilitates passage of impregnated resinous binder within the composite tubular structure through the compression section 41. At each compression zone 65, a local portion of the resinous binder may be parted by the pressing action, causing the binder to be momentarily displaced away from the contact line at the compressed zone. However, passage of the binder is not blocked, and the displaced binder can return to the section which was squeezed upon removal of the pressing action.

The compression of the tubular structure 12 at a series of spaced intervals 67 facilitates passage of impregnated resinous binder within the composite tubular structure through the compression section 41. The pressing action in effect divides the portion 12a of the tubular structure 12 into a series of sections configured as pockets 12b between adjacent compression zones 65, with each pocket 12b containing some of the resinous binder. Resinous binder displaced by the pressing action at each compression zone 65 flows into the adjacent pockets 12b on opposed sides of the compression zone 65. The resinous binder is conveyed through the compression section 41 within the pockets 12b, with the pockets moving in unison with the tubular structure 12.

Accordingly, while the compression apparatus 10 performs the function of a valve to close the interior of the inner tube 30 within the tubular structure 12 at the various compression zone 65 to prevent the escape of inflation fluid from the inflation cavity 33, such valve does not act to stop, or adversely impede, the passage of impregnated resinous binder within the tubular structure through the compression section 41. The section of the assembled tubular structure 12 beyond the compression apparatus 10 which is expanded by the inflation fluid is shown in FIG. 1 and is identified by reference numeral 12c.

As mentioned above, the compression apparatus 10 may act to control the rate at which the pipe 20 is inflated and thus constructed. It may do this by, for example, controlling the rate at which the inflation cavity 33 advances along the tubular structure 12. Further, the compression apparatus 10 may exert traction to the tubular structure 12 to facilitate continued construction of the elongate hollow structure. In one arrangement, the traction exerted may comprise a driving force for conveying the tubular structure 12 through the compression section 41, as discussed previously. The driving force may also function to drive, or at least assist in driving the tubular structure 12 along a path of intended travel. In another arrangement, the traction exerted may comprise a retarding or braking force to control the rate of movement of the tubular structure 12 through the compression section 41, as also discussed previously. The retarding or braking force may also function to control, or at least assist in controlling, the rate of deployment of the tubular structure 12.

The compression apparatus 10 further comprises registration means 110 for causing the respective pairs 63 of opposed contact elements 60 to be maintained in registration with each other while moving along the compression section 41; that is, while moving along the opposed linear path sections 93.

There is a need for the respective pairs 63 of opposed contact elements 60 to be maintained in registration with each other while moving along the compression section 41 in order to provide an effective seal at the respective compression zone 65. There is also a need for the respective pairs 63 of opposed contact elements 60 to be maintained in registration with each other while moving along the compression section 41 in order to achieve sufficient traction between the compression apparatus 10 and the tubular structure 12 for driving or braking purposes, as previously discussed.

In the absence of the registration means 110, it may be that lateral loadings imposed upon the opposed contact elements 60 of each pair 63 may cause the contact elements to shift laterally one with respect to the other so as to be offset and no longer in registration. The lateral loadings imposed upon the opposed contact elements 60 of each pair 63 may comprise drag forces existing between the tubular structure 12 and the opposed contact elements 60 in engagement with the tubular structure. Additionally, or alternatively, the lateral loadings imposed upon the opposed contact elements 60 of each pair 63 may comprise forces generated on the tubular structure 12 by the pressure of the inflation fluid within the inflation cavity 33 at the end of the tubular structure closed by the compression apparatus 10.

In the arrangement described and illustrated, the registration means 110 comprise a mechanical registration system configured as a mechanical coupling 111 between the upper set 61 of contact elements 60 carried on the upper endless chain assembly 51 and the lower set 62 of contact elements 60 carried on the lower endless chain assembly 52.

The mechanical coupling 111 comprise counterpart registration elements 113 on the respective pairs 63 of opposed contact elements 60, the counterpart registration elements 113 of each respective pair 63 being adapted to cooperate when the respective pair is in registration. In the arrangement shown, there are counterpart registration elements 113 on all respective pairs 63 of opposed contact elements 60. In another arrangement, there may be counterpart registration elements 113 on only some of respective pairs 63 of opposed contact elements 60. In the latter case, it is desirable that counterpart registration elements 113 on at least one respective pair 63 of opposed contact elements 60 passing along the compression section 41 are in cooperation at any one time.

The counterpart registration elements 113 comprise mating elements 115 which, in the arrangement shown, comprise a registration pin 117 and a mating registration slot 119, the registration pin being receivable in the mating registration slot to establish registration between the respective pair 63 of opposed contact elements 60. The mating elements 115 are mounted on the ends of the contact elements 60, with a respective mating element at each end. In the arrangement shown, mating elements 115 on contact elements 60a comprise the registration pins 117, and mating elements 115 on contact elements 60b comprise the registration slots 119. The registration pins 117 are mounted at the outboard ends of contact elements 60a and are disposed adjacent the elongate contact edge 105 which defines the contact portion 101. The registration slots 119 are incorporated in end plates 121 mounted at the outboard ends of contact elements 60b. Each end plate 121 has an edge 123 which is oriented to confront the compression section 41, with the respective registration slot 119 opening onto the edge 123 and also being aligned adjacent the elongate contact edge 105 which defines the contact portion 101 of the contact element 60b.

As previously described, the endless chain assembly 50 is operable to move around an endless path comprising inner run 81 which includes linear run section 87, and transition sections 89 at opposed ends of the linear run section 87. [00159] One of the transition sections 89 comprises an entry transition section 89a and the other comprises a departure transition section 89b. The arrangement is such that as the contact elements 60 are circulated around their endless paths, the contact elements 60a, 60b of each respective pair 63 progressively advance towards each other while moving through their entry transition sections 89a to the linear run sections 87. The contact elements 60a, 60b of each respective pair 63 assume mating engagement upon arrival at the linear run sections 87. At this stage, the registration pin 117 on the contact element 60a of the respective pair 63 has located in the registration slot 119 of the counterpart contact element 60b, thereby coupling the two contact elements 60a, 60b together for movement in unison along the their linear run sections 87. Once the coupled contact elements 60a, 60b complete their respective linear run sections 87, they enter their departure transition sections 89b. While advancing along their respective departure transition sections 89b, the contact elements 60a, 60b of each respective pair 63 progressively separate from each other and, once separated, move independently of each other around their respective endless paths 91, 92.

With this arrangement, the contact elements 60a, 60b of each respective pair 63 are maintained in registration with each other by virtue of the coupling engagement therebetween while moving along the compression section 41. This registration ensures that the elongate contact edges 105 of the respective opposed contact elements 60 in registration are maintained in correct alignment to establish the compression zone 65 between the opposed elongate contact edges 105 at which a localized concentrated pressing action is imposed on the tubular structure 12 to close the inner tube 30 and thereby establish the fluid seal.

As mentioned above, the lower frame 49 is selectively movable relative to the upper frame 47 to provide adjustment of the compression section 41. Accordingly, the two secondary frames 45 are selectively movable one relative to the other to vary the size of the gap 68 between the two contact elements 60a, 60b constituting each pair 63 advancing along the compression section 41.

The depth of each registration slot 119 is sufficient to accommodate a range of gap sizes between the two contact elements 60a, 60b constituting each pair 63. The capacity to vary the size of the gaps 68 between the contact elements 60a, 60b is advantageous as it may permit the compression apparatus 10 to be adjusted to accommodate tubular structures 21 of a variety of wall thicknesses. In the arrangement shown, the lower frame 49 is supported on the primary frame 44 by way of a support assembly 131 which includes extensible supports 133 such as hydraulic rams. With this arrangement, actuation of the extensible supports 133 can move the lower frame 49 relative to the main frame 44, and thereby adjust the relative positions of the upper endless chain assembly 51 and the lower endless chain assembly 52. This has the effect of varying the relative positions of the linear run sections 87 of the endless chain assemblies 50 and thereby providing adjustment of the compression section 41.

The support assembly 131 may incorporate a system configured to monitor the compression load imposed upon a tubular structure passing through the compression section 41 and to adjust the compression load as required for maintaining the load within a selected range. The monitoring system may, for example, be operable though monitoring hydraulic pressure in a hydraulic circuit provided for actuating hydraulic rams functions as the extensible supports 133.

A safety release function (not shown) may be incorporated in the compression apparatus; specifically, for example, in association with the lower frame 49. When a safety incident is identified or triggered through a switching mechanism, a safety procedure is initiated. In one embodiment, when a safety incident is triggered, pressure is released from the extensible supports 133 and the lower frame 49 is lowered relative to the main frame 44. There may also be a close-off mechanism, such as for example a sealing guillotine, associated with the tubular structure 12 separately of the compression apparatus 10.

An adjustment system 141 may be provided for tensioning each endless chain assembly 50. In the arrangement shown, the adjustment system 141 is configured to adjust the tension of the two endless chain structures 71 constituting each endless chain assembly 50. With this arrangement, the adjustment system 141 comprises two tensioning mechanisms 143 each associated with one of the endless chain structures 71. Each tensioning mechanism 143 comprises a tensioning sprocket 145 about which the outer run 83 of the corresponding endless chain structures 71 passes. The tensioning mechanism 143 further comprises a support arm 147 upon which the tensioning sprocket 145 is rotatably supported. The support arm 147 is selectively adjustable to vary the position of the tensioning sprocket 145 when in engagement with the outer run 83 of the corresponding endless chain structure 71, thereby causing deflection of the outer run 83 and adjusting the tension in the endless chain structure.

In the embodiment described and illustrated in FIGS. 1 to 6, the counterpart registration elements 113 comprise mating elements 115 which, in the arrangement shown, comprise registration pin 117 and mating registration slot 119, the registration pin being receivable in the mating registration slot to establish registration between the respective pair 63 of opposed contact elements 60. The registration slots 119 are incorporated in end plates 121 mounted at the outboard ends of contact elements 60*b*. Each end plate 121 has an edge 123 which is oriented to confront the compression section 41, with the respective registration slot 119 opening onto the edge 123. In a variation, the registration slot 119 may be configured to provide clearance for the path of the counterpart registration pin 117 as the latter moves towards and into the registration slot and as it subsequently moves out of and away from the registration slot.

Figure 7:
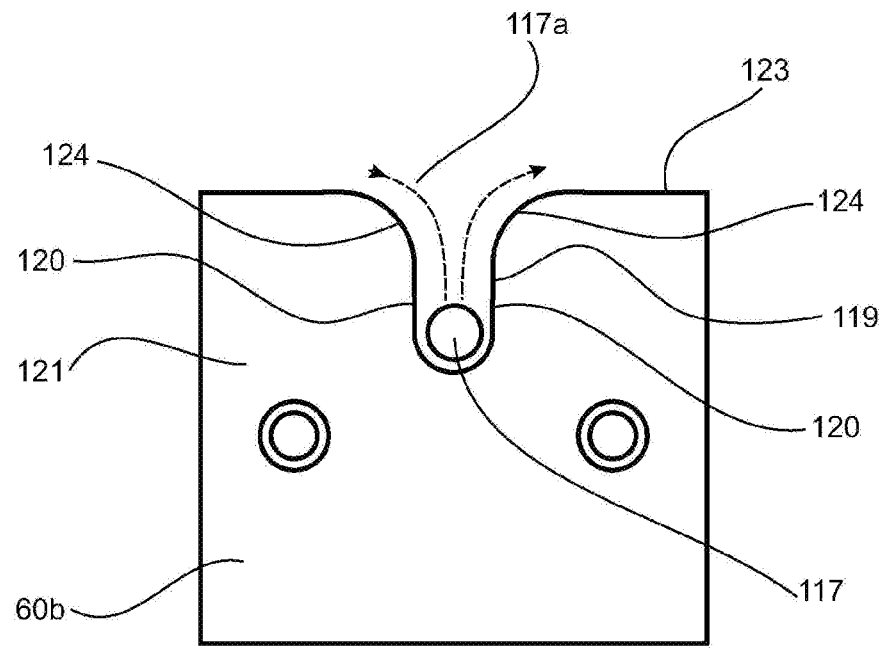
FIG. 7 is a view of a modified form of registration slot.

An example of such an arrangement is illustrated in FIG. 7 and comprises the registration slot 119 being defined between two slot edges 120 which extend to the edge 123, with the transition 124 between each slot edge 120 and the end plate edge 123 being curved to provide clearance for the path of the counterpart registration pin 117. In FIG. 7, the path of the registration pin 117 as it moves towards and into the registration slot 119 and as it subsequently moves out of and away from the registration slot is shown by dotted line identified by reference numeral 117*a*.

Figure 8:
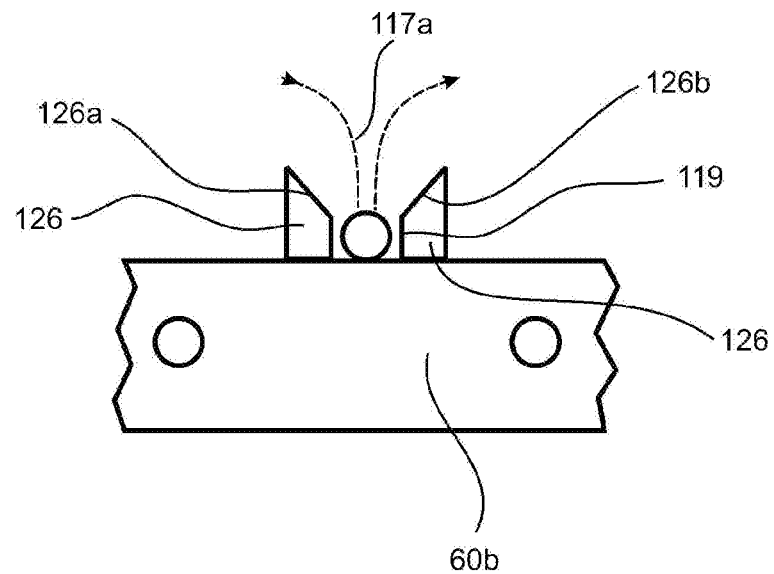
FIG. 8 is a view of a further modified form of registration slot.

In another arrangement as illustrated in FIG. 8, there is no end plate and the registration slot 119 is defined between two protrusions 126 at each end of the respective contact elements 60*b*, with the outer end sections 126*a* of the protrusions being configured to provide clearance for the path 117*a* of the counterpart registration pin 117. In the embodiment described and illustrated, the registration means 110 comprises a mechanical registration system configured as a mechanical coupling 111. Other arrangements for a mechanical coupling are, of course, possible.

In another embodiment, the registration means may comprise an electronic registration system. The electronic registration system may comprise an electronic coupling between the first and second sets of contact elements 61, 62 operable to drive the contact elements 61, 62 synchronously. More particularly, the electronic registration system may comprise an electronic control system for controlling drive imparted to the two carrier structures 50, whereby the two endless carrier structures are driven synchronously.

The electronic control system may control drive motors for driving the two carrier structures 50. The drive motors may comprise electric motors. The drive motors may be integrated in the common drive system 73 for driving the two endless chain structures 71 within the respective endless chain assembly 50.

The motors can be stepper motors with fixed angles of movement between each magnetic pulse induced by the frequency of the power supply or synchronous motors where the power controls the general movement of the motor but not to the same level of accuracy and primarily for torque loads. However once locked into the frequency of operation all synchronous electric motors on the circuit will rotate at the same speed and past the same magnet set at the same time, holding magnetic alignment and thus revolutions completed during a period of operation. The skilled addressee will recognize that alternative types of synchronous electric motors could be used to assist in maintaining synchrony in the movement of the endless chain assemblies 50.

While the registration means 110 has been described and illustrated in relation to the compression apparatus 10, it should be appreciated that it can be utilized in relation to any appropriate compression apparatus, including for example the various forms of compression device described and illustrated in aforementioned PCT/AU2011/001401, the contents of which are incorporated herein by way of reference.

In the embodiment described and illustrated in FIGS. 1 to 6, the contact elements 60 are adapted to provide rigid contact with the tubular structure 12 when in engagement therewith. Other arrangements are, of course, possible. By way of example, at least some of the contact elements 60 may be adapted to provide compliant contact with the tubular structure 12 when in engagement therewith. Such contact elements may hereinafter be referred to as compliant contact elements.

The compliant contact elements 60 may each comprise a contact portion 101 which is compliant, thereby accommodating irregularities in the surface of the tubular structure 12 with which it is in engagement. In particular, the compliant contact portion 101 is deformable in response to a compression loading as the tubular structure 12 is compressed. The deformation serves to accommodate irregularities in the surface of the tubular structure 12 to provide an effective seal for closing the tubular structure 12 against the passage of air while allowing the impregnated resinous binder within the tubular structure to pass through the compression area 41 as previously described. With such an arrangement, at least one of the contact elements 60 in each pair may comprise a compliant contact element.

The contact portion 101 may be of resilient construction or may comprise resilient material in order to be compliant. For example, the compliant contact portion 101 is deformable in response to a compression loading as the tubular structure 12 is compressed. The deformation serves to accommodate irregularities in the surface of the tubular structure 12.

In one arrangement, only one of the two cooperating contact elements 60 of each pair comprises a compliant contact element. In another arrangement both of the cooperating contact elements 60 of each pair comprise compliant contact elements. Where only one of the contact elements 60 of each pair comprises a compliant contact element, the tubular structure 12 is pinched between the compliant contact portion 101 on one element 60 and a rigid contact portion 101 on the other element 60. Where both of the cooperating contact elements 60 of each pair comprise compliant contact elements, the tubular structure 12 is pinched between the two opposing compliant contact portions 101.

In an arrangement illustrated in FIGS. 9 and 10, only one of the two cooperating contact elements 60 of each pair 63 comprises a compliant contact element. With such an arrangement, the compliant contact portion 101 comprises a body 151 of resiliently deformable material on the two longitudinal side faces 107 to present the contact edge of the contact portion 101. In the arrangement shown, the body 151 comprises a layer of such material applied to the elongate element 108 of the bar assembly 103. The layer of resiliently compressible material may comprise an elastomeric or rubber material which is deformable to provide the compliant contact portion 101. It is believed that Linatex natural rubber is likely to be particularly suitable. The layer of resiliently compressible material may comprise a single layer of such material or a plurality of layers. Where there is a plurality of layers, the various layers may comprise the same material or different materials according to the required performance characteristics. The contact portion 101*b* of the other contact elements 60 of the pair 63 is of a rigid construction and therefore not compliant. In the arrangement shown in FIGS. 9 and 10, the upper contact element 60 has the rigid contact portion 101*b* which does not deform (as depicted by a straight line X) and the lower contact element 60 has the compliant contact portion 101*a* which is shown in a deformed condition (as depicted by a flowing line Y) accommodating irregularities in the compressed tubular structure 12.

In another arrangement both of the cooperating contact elements 60 of each pair 63 comprise compliant contact elements. Such an arrangement is illustrated in FIG. 11 where the compliant contact portions 101 each comprises a body 151 of resiliently deformable material, such as a layer of such material, on the two longitudinal side faces 107 and around the contact edge 105 of the respective contact portion. Each layer of resiliently compressible material may comprise an elastomeric or rubber material which is deformable to provide the compliant contact portion 101. It is believed that Linatex natural rubber is likely to be particularly suitable. Again, each layer of resiliently compressible material may comprise a single layer of such material or a plurality of layers. Where there is a plurality of layers, the various layers may comprise the same material or different materials according to the required performance characteristics. Other configurations for the contact elements are possible, several examples of which are described below and illustrated in FIGS. 12 to 14.

FIG. 12 illustrated another configuration of a compliant contact element 60. In the arrangement illustrated in FIG. 12, the compliant contact element 60 comprises base portion 161 and further portion 162 supported on the base portion. The base portion 161 may be of rigid construction and is configured to provide a cradle in which the further portion 162 is carried. The further portion 162 may comprise a resiliently deformable elongate element 163 (such as, for example, a resiliently deformable tube) to define the contact portion 101. The resiliently deformable elongate element 163 presents a surface which defines the contact portion 101. More particularly, the resiliently deformable elongate element 163 is accommodated in the cradle 165, with a longitudinal side portion of the elongate element 163 being exposed to present a surface which defines the contact portion 101. The cradle may comprise a channel in which the resiliently deformable elongate element 163 is received.

By way of example, the resiliently deformable tube 163 may comprise a length of flexible hose, such as hose for hydraulic fluid. The interior of the resiliently deformable tube may be closed, and a body of fluid may be contained within the interior of the tube to distribute loadings imposed on the tube through the contact portion 101 engaging the surface of the tubular structure 12. The fluid may comprise a compressible fluid such as a gas, which may comprise air, or more preferably an incompressible fluid such as a liquid.

In the arrangement illustrated in FIG. 12, the base portion 161 comprises a shank 161*a* upstanding from the chain portions 71*a* and a head 161*b* on the shank, with the head 161*b* being configured to define the cradle for receiving and supporting the further portion 162. In the arrangement shown, the further portion 162 comprises a resiliently deformable elongate element 165 such as, for example, a resiliently deformable tube 167 to define the contact portion 101. In FIG. 12, the tube 167 is shown slightly spaced from the cradle defined by the head 161*b*. However, this is simply for the purposes of clarity in the drawing, and the tube 167 in fact rests upon the cradle defined by the head 161*b*.

An arrangement in which one of the contact elements 60*b* of each pair 63 comprises the construction shown in FIG. 12 is depicted in FIG. 13, with compression zone 65 defined therebetween. In this arrangement, the other contact element 60*c* of the pair is of non-compliant (rigid) construction.

An arrangement in which both of the contact elements 60 of each pair 63 comprise the construction shown in FIG. 12 is depicted in FIG. 14, with compression zone 65 defined therebetween. While the compliant contact elements 60 have been described and illustrated in relation to the compression apparatus 10, it should be appreciated that they can be utilized in relation to any appropriate compression apparatus, including for example the various forms of compression device described and illustrated in aforementioned PCT/AU2011/001401, the contents of which are incorporated herein by way of reference.

As explained previously, the manner in which the tubular structure 12 passes through the compression section 41 defined within the compression apparatus 10 may depend upon the manner in which the tubular structure is constructed. In one arrangement, the assembled tubular structure 12 may advance through the compression section 41 defined within the compression apparatus 10; that is, the compression apparatus 10 may be stationary and the tubular structure 12 may move through the compression apparatus 10. In another arrangement, the compression apparatus 10 may advance along the tubular structure 12; that is, the tubular structure 12 may be stationary and the compression apparatus 10 may move along it. In yet another arrangement, both the compression apparatus 10 and the tubular structure 12 may move in a manner whereby the tubular structure 12 passes through the compression section 41 defined within the compression apparatus 10.

In any event, as the section 12*c* of the tubular structure 12 leaves the compression section 41 and is inflated, there is some prospect that it might droop and come into contact with the lower endless chain assembly 52. This may lead to entanglement and potential damage to the tubular structure 12.

With a view to avoiding such an occurrence, a support structure 200 may be provided for supporting that portion 12*d* of the section 12*c* of the tubular structure 12 exiting the compression section 41 of the compression apparatus 10, as shown in FIG. 15. The support structure 200 may serve to maintain that portion 12*d* of tubular structure 12 in general alignment with the path followed by the tubular structure 12 through the compression apparatus 10 until such time as it is sufficiently clear of the lower endless chain assembly 52 to avoid contact.

In the arrangement shown, the support structure 200 comprises a support bed 201 disposed adjacent the exit end of the compression apparatus 10 and so positioned to receive and support the exiting portion 12*d* of tubular structure 12 on the underside thereof. The support structure 200 may comprise a roller conveyor 203 in which various roller cooperate to define the support bed 201. The rotational axes of the various rollers in the roller conveyor 203 are disposed transverse to the direction of relative movement of the exiting portion 12d of tubular structure 12 and thereby allow the exiting portion 12d to more relatively freely over the support bed 201 without adverse drag.

In FIG. 15, it can be seen that the exiting portion 12d of tubular structure 12 commences to progressively inflate in sections 12e in the intervals 67 between adjacent pairs 63 of contact elements 60 as they commence to separate at the exit end of the compression apparatus 10. A guide structure 250 is also provided to guide movement of the exiting portion 12d of tubular structure 12 with respect to the support structure 200, as shown in FIGS. 15 and 16.

In the arrangement shown, the exiting portion 12d of tubular structure 12 is guided in its movement towards and over the support structure 200. The guided movement is provided by the guide structure 250 controlling the position of the exiting portion 12d of tubular structure 12. The guide structure 250 defines a guide path 251 through which the exiting portion 12d of tubular structure 12 can move in a guided manner. The guide path 251 is located adjacent the support structure 200. In the arrangement shown, the guide structure 250 is located adjacent the support structure 200 at the end thereof remote from the compression device 10. With this arrangement, the exiting portion 12d of tubular structure 12 passes beyond the support structure 200 before encountering the guide structure 250, as shown in FIG. 15.

The guide structure 250 comprises two side rollers 253 rotatable about vertical axes 253a and a base roller 255 rotatable about horizontal axis 255a, with the two side rollers 253 and base roller 255 cooperating to define the guide path 251. In particular, the two side rollers 253 and base roller 255 present rolling surfaces which contact the exiting portion 12d of tubular structure 12 to guide movement of the exiting portion 12d of tubular structure without adverse drag.

While the support structure 200 has been described and illustrated in relation to the compression apparatus 10, it should be appreciated that it can be utilized in relation to any appropriate compression apparatus, including for example the various forms of compression device described and illustrated in aforementioned PCT/AU2011/001401, the contents of which are incorporated herein by way of reference. Similarly, this also applies to the guide structure 250.

As previously discussed, the outer casing 38 and possibly also some of the various reinforcing fabric tubular layers may incorporate vents at intervals along their respective lengths to facilitate expulsion of air. In one arrangement, the vents may comprise perforations, such as puncture holes, formed in the outer casing 38. With such an arrangement, the perforations are ultimately sealed by the resinous binder to ensure the sealed integrity of the pipe 20.

A perforation system may be provided for perforating the outer casing 38 to provide the vents. In the arrangement shown, the perforation system comprises a perforating mechanism 260 for perforating that portion 12d of the section 12c of the tubular structure 12 exiting the compression section 41 of the compression apparatus 10, as shown in FIG. 15.

The perforating mechanism 260 comprises a pin wheel 263 comprising a rotatable base 265 and a plurality of perforating pins 267 protruding radially from the rotatable base 265. The perforating pins 267 comprise elements having pointed outer ends for puncturing the outer casing 38. The perforating pins 267 also displace reinforcing fabric which is adjacent the outer casing 38 around the perforations to facilitate air release through the reinforcement 37. The perforating pins 267 are sized to puncture the outer casing 38 and also displace reinforcing fabric adjacent around the perforations without puncturing the tube 30 comprising the inner portion 21.

The perforating mechanism 260 further comprises a support structure 271 for rotatably supporting the pin wheel 263. The support structure 271 is adapted to yielding support the pin wheel 263 in a manner biasing the pin wheel into pressing engagement with the inflated section 12d of the tubular structure 12 exiting the compression section 41 of the compression apparatus 10, as shown in FIG. 15. In the arrangement shown, the support structure 271 comprises spring mechanism 273 to provide the yielding support for the pin wheel 203.

The perforating mechanism 260 is shown schematically in position in FIG. 15. While not so depicted in FIG. 15, the perforating mechanism 260 would typically be associated with the guide structure 250, with the pin wheel 263 positioned directly above base roller 255, whereby portion 12d of the section 12c of the tubular structure 12 exiting the compression section 41 of the compression apparatus 10 can pass between the pin wheel 263 and the base roller 255; that is, below the pin wheel 263 and above the base roller 255. With this arrangement, the base roller 255 is able to counteract forces imposed on the inflated tubular structure 12 by the pin wheel 263.

In this embodiment, the pin wheel 263 is not powered, but rather is caused to rotate by virtue of engagement with the tubular structure 12 moving relative to the pin wheel. Other arrangements are, of course, possible, including a powered pin wheel. Other arrangements of perforating mechanism are also possible, including for example a reciprocating perforating mechanism. A rotatable pin wheel is, however, advantageous as it can offer consistency in the depth of penetration of the tubular structure 12.

One system 280 for implementation of the compression apparatus 10 for production of pipe 20 is depicted schematically in FIGS. 17 to 20. In the arrangement shown, the compression apparatus 10 is mounted on a vehicle 281 adapted to travel along a site at which the pipe 20 is being produced and laid.

Figure 18:
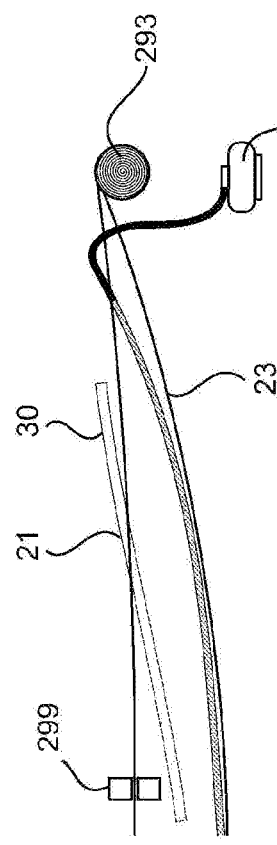
FIG. 18 depicts, schematically, the process performed on the vehicle shown in FIG. 17 for production of a pipe.

FIG. 18 depicts, schematically, the process performed on the vehicle 281 to position the assembled material 293 about the tube 30 to provide the outer portion 23. The vehicle 281 comprises a truck 283 having a load carrying portion 285 configured to receive the compression apparatus 10 as well as other apparatus, equipment and supplies used in the pipe production process.

In the arrangement shown, the other apparatus, equipment and supplies comprise a container 291 accommodating tube 30 stored in a compact condition; for example, a lay-flat state with sections of the tube folded back and forth one upon another. The tube 30 can be progressively withdrawn from the container 291 during the pipe assembly process. When the supply of tube 30 requires replenishment, the existing container 291 can be removed from the load carrying portion 285 of the truck 283 and substituted with a replacement container accommodating a new supply of tube 30. The tube 30 provides the inner portion 21 which is ultimately surrounded by the outer portion 23, with the two portions 21, 23 merging together to provide the integrated tubular wall structure 25. Further, there is a supply of assembled material 293 which provides the outer portion 23. In the arrangement shown, the supply of v is in roll form. Resinous binder used in the process to integrate the two portions 21, 23 is accommodated in reservoir 297. There is also provided a welding unit 299 for welding the outer casing around the tube 30.

Figure 19:
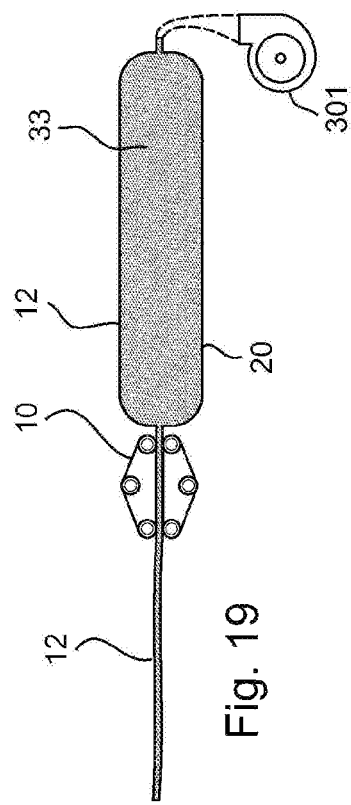
FIG. 19 depicts, schematically, inflation of the assembled tubular structure.

FIG. 19 depicts, schematically, inflation of the assembled tubular structure 12 through delivery of inflation fluid such as air by way of blower 301 at the distal end of the tubular structure. The inner tube 30 of the assembled tubular structure 12 is closed by the compression apparatus 10 on the vehicle 281. The compression apparatus 10 is positioned at or adjacent the end 285a of the load carrying portion 285 of the truck 283 such that the assembled tubular structure 12 can "snake" downwardly from the truck 283 and onto the ground over which the truck is travelling as the pipe 20 is progressively produced. The compression apparatus 10 advances with the vehicle 281. In FIG. 19, the assembled tubular structure 12 is shown in an inflated condition behind the advancing compression apparatus 10 and in an uninflated condition ahead of the advancing compression apparatus 10.

Figure 20:
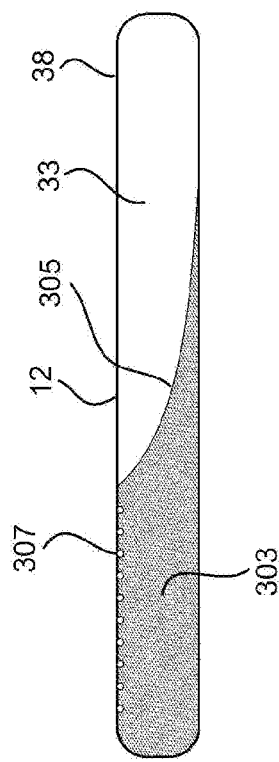
FIG. 20 depicts, schematically, inflation of the assembled tubular structure and movement of resinous binder through reinforcement within the assembled tubular structure.
Figure 17:
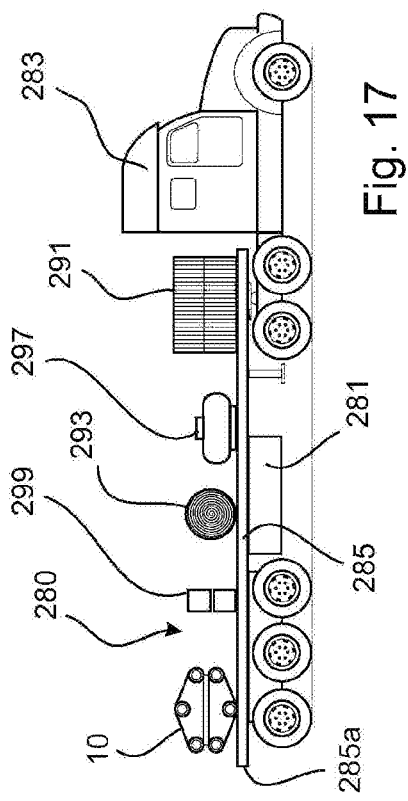
FIG. 17 depicts a system for implementation of the compression apparatus for formation of a pipe, the system comprising a vehicle on which the compression apparatus is mounted.

FIG. 20 depicts, schematically, inflation of the assembled tubular structure 12 and movement of resinous binder through reinforcement 37 within the tubular structure. As the assembled tubular structure 12 is progressively inflated and the space 39 in which the reinforcement 37 is confined progressively decreases, the resinous binder is forced through the layers of reinforcing fabric for distribution within the space 39 in a controlled and constrained manner. The resinous binder is caused to move through the reinforcement 37 within the space 39 as a progressively rising resin pool 303 as a consequence of the progressively decreasing volume of the space 39. The progressively rising resin pool 303 is shown schematically in FIG. 20, with the notional surface of the progressively rising resin pool 303 being identified by reference numeral 305. Vents 307 in the outer casing 38 to facilitate expulsion of the air from space 39 are also shown. The vents 307 may comprise perforations formed by perforating mechanism 260 operating as previously described.

The example embodiments having been described, it is apparent that such have many varied applications. For example, the example embodiments may be applicable but not limited to connection to various devices, structures and articles.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

I claim:

1. A compression apparatus, comprising:
   first and second sets of contact elements, each set of contact elements comprising a plurality of contact elements movable along a respective endless path having a linear path section, the contact elements in each set being in spaced relation with one another and disposed transversely to the direction of movement along the endless path, the two linear path sections being in opposed relation to receive a tubular structure therebetween, the contact elements in the first and second sets being movable along the linear path sections in a coordinated sequence with respective contact elements being in registration in pairs, each pair defining a compression zone therebetween, whereby the tubular structure is adapted to be compressed between pairs of opposed contact elements at spaced intervals corresponding to the compression zones along a portion of the length of the tubular structure, and
   a mechanical coupling arranged between each pair of opposed contact elements of the first and second sets for causing the respective pairs of opposed contact elements to be maintained in registration with each other while moving along the opposed path sections.

2. The compression apparatus according to claim 1, wherein each set of contact elements is mounted on or incorporated in a carrier structure adapted to convey the contact elements along the endless path.

3. The compression apparatus according to claim 1, wherein each elongate contact portion is configured to present a contact edge extending transversely to the path section.

4. The compression apparatus according to claim 3, wherein each contact element is of angular cross-section to define an elongate contact edge.

5. The compression apparatus according to claim 1, wherein the mechanical coupling for each pair of opposed contact elements includes:
   at least one registration pin associated with one contact element of the pair, and
   a mating registration slot associated with the other opposed contact element of the pair, the pin receivable in the slot to establish registration between each pair of opposed contact elements.

6. The compression apparatus according to claim 5, wherein a registration pin is mounted at each end of a respective contact element and disposed adjacent the elongate contact edge which defines the contact portion.

7. The compression apparatus according to claim 5, wherein each registration slot is incorporated in an end plate mounted at either end of a respective contact element.

8. The compression apparatus according to claim 5, wherein each of the registration slots are defined between two protrusions mounted on the respective contact elements.

9. The compression apparatus according to claim 5, wherein the registration slot associated with the other opposed contact element of the pair is configured to provide clearance for the path of the registration pin associated with the one contact element of the pair, as the latter moves towards and into the registration slot and as it subsequently moves out of and away from the registration slot.

10. The compression apparatus according to claim 1, wherein at least some of the contact elements are adapted to provide rigid contact with the tubular structure when engaged with the tubular structure.

11. The compression apparatus according to claim 1, wherein at least some of the contact elements are adapted to provide compliant contact with the tubular structure when engaged with the tubular structure.

12. The compression apparatus according to claim 11, wherein at least one of the contact elements has a contact portion for engaging the tubular structure with compliant contact.

13. The compression apparatus according to claim 11, wherein the contact portion with compliant contact is of resilient construction.

14. The compression apparatus according to claim 1, further comprising:
a support structure for supporting that portion of the tubular structure exiting a compression area defined between the respective contact elements when in registration in pairs.

15. The compression apparatus according to claim 1, wherein the compression zone defined between the respective contact elements of each pair is configured to apply a localized pressing action on the tubular structure at the respective compression zone to compress the tubular structure.

16. A compression apparatus, comprising:
first and second sets of contact elements, each set comprising a plurality of contact elements movable along a respective endless path having a linear path section, the contact elements disposed transversely to the direction of movement along the path, the two linear path sections in opposed relation and adapted to receive a tubular structure therebetween, the contact elements in the first and second sets being movable along the linear path sections in coordinated sequence with respective contact elements opposed to one another being in registration in pairs, each pair of opposed contact elements defining a compression zone therebetween, and
a mechanical coupling arranged between each pair of opposed contact elements of the first and second sets for causing the respective pairs of opposed contact elements to be maintained in registration with each other while moving along the opposed path sections,
wherein the contact elements further include elongate contact portions adapted for pressing engagement with the tubular structure.

17. The compression apparatus according to claim 16, further comprising:
a support structure for supporting that portion of the tubular structure exiting a compression area defined between the respective contact elements when in registration in pairs.

18. The compression apparatus according to claim 16, wherein the compression zone defined between the respective contact elements of each pair is configured to apply a localized pressing action on the tubular structure at the respective compression zone to compress the tubular structure.

19. A method of constructing a hollow structure comprising a radially, inner portion and a radially outer portion, with the two portions being assembled together to provide a tubular structure, the method comprising:
expanding the inner portion by injecting an inflation fluid into an end thereof,
compressing the tubular structure at a location distal to the end from which the inflation fluid is introduced so that inflation fluid cannot pass through the location distal to the end, the compression of the tubular structure caused by relative movement between the tubular structure and a compression section,
the compression section further including a series of compression zones defined between pairs of opposed contact elements, the pairs of opposed contact elements movable along linear path sections in a coordinated sequence, each pair of opposed contact elements having a mechanical coupling arranged therebetween for causing the respective pairs of opposed contact elements to be maintained in registration with each other while moving along the linear path sections, the pairs of opposed contact elements presenting elongate contact portions adapted for pressing engagement with the tubular structure at spaced intervals to cause compression thereof, and
maintaining the pairs the opposed contact elements in registration with each other via the mechanical coupling while defining the compression zones.

20. A method of constructing a hollow structure comprising a radially, inner portion and a radially outer portion, with the two portions being assembled together to provide a tubular structure, the method comprising:
expanding the inner portion by injecting an inflation fluid into an end thereof,
compressing the tubular structure at a location distal to the end from which the inflation fluid is introduced so that inflation fluid cannot pass through the location distal to the end, the compression of the tubular structure caused by relative movement between the tubular structure and a compression section,
the compression section further including a series of compression zones defined between pairs of opposed contact elements, the pairs of opposed contact elements movable along linear path sections in a coordinated sequence, each pair of opposed contact elements having a mechanical coupling arranged therebetween for causing the respective pairs of opposed contact elements to be maintained in registration with each other while moving along the linear path sections, the pairs of opposed contact elements presenting elongate contact portions adapted for pressing engagement with the tubular structure at spaced intervals to cause compression thereof, the elongate contact portion of at least one of each pair of opposed contact elements being compliant.

21. A compression apparatus, comprising:
first and second sets of contact elements, each set comprising a plurality of contact elements movable along a respective endless path having a linear path section, the contact elements in each set disposed transversely to the direction of movement along the endless path, the two linear path sections in opposed relation to receive a tubular structure therebetween, the contact elements in the first and second sets movable along the linear path sections in a coordinated sequence with respective contact elements in registration in pairs, each pair defining a compression zone therebetween, whereby the tubular structure is adapted to be compressed between pairs of opposed contact elements corresponding to the compression zones along a portion of the length of the tubular structure, and
a electronic registration for causing the respective pairs of opposed contact elements to be maintained in registration with each other while moving along the opposed path sections.

22. The compression apparatus according to claim 21, wherein the electronic registration system further comprises an electronic coupling between the first and second sets of contact elements that is operable to synchronously drive the contact elements.

23. The compression apparatus according to claim 21, wherein the compression zone defined between the respective contact elements of each pair is configured to apply a localized pressing action on the tubular structure at the respective compression zone to compress the tubular structure.

\* \* \* \* \*